United States Patent
Sharp et al.

(10) Patent No.: US 12,425,226 B2
(45) Date of Patent: Sep. 23, 2025

(54) MULTI-PARTY BLOCKCHAIN TRANSACTION APPROVAL WORKFLOW

(71) Applicant: BLOCKDAEMON INC., Los Angeles, CA (US)

(72) Inventors: Christopher Sharp, Fort Meyers, FL (US); Petar Kirov, Sofia (BG); Guillaume Lethuillier, Paris (FR); Vincent Kobel, Geneva (CH); Morten Vaerum, Viby J (DK)

(73) Assignee: Blockdaemon Inc., Los Angeles, CA (US)

( * ) Notice: Subject to any disclaimer, the term of this patent is extended or adjusted under 35 U.S.C. 154(b) by 210 days.

(21) Appl. No.: 18/196,103

(22) Filed: May 11, 2023

(65) Prior Publication Data

US 2024/0380604 A1    Nov. 14, 2024

(51) Int. Cl.
*H04L 29/06* (2006.01)
*H04L 9/00* (2022.01)
*H04L 9/32* (2006.01)

(52) U.S. Cl.
CPC ............. *H04L 9/3242* (2013.01); *H04L 9/50* (2022.05)

(58) Field of Classification Search
CPC ..... H04L 9/3242; H04L 9/50; H04L 63/0263; H04L 63/0442; H04L 63/20; H04L 63/10
See application file for complete search history.

(56) References Cited

U.S. PATENT DOCUMENTS

2021/0097528 A1* 4/2021 Wang ............... H04L 9/30

OTHER PUBLICATIONS

Wikipedia (Ethereum): Apr. 18, 2023 (year 2023).*
Wikipedia, "Ethereum," undated, 17 pages, [Online] [Retrieved on Dec. 10, 2024] Retrieved from the internet <URL: https://en.wikipedia.org/w/index.php?title-Taxicab&oldid=703743153>.
PCT International Search Report and Written Opinion, PCT Application No. PCT/US2024/028441, Sep. 9, 2024, 89 pages.

* cited by examiner

*Primary Examiner* — Longbit Chai
(74) *Attorney, Agent, or Firm* — Fenwick & West LLP

(57) ABSTRACT

A system may include a remote server and an on-premises node. The server may receive a first set of parameters defining a blockchain operation. The server may generate an operation payload based on the parameters. The on-premises node may receive the operation payload from the computing server and decode the operation payload to extract a second set of parameters reflected in the operation payload. The on-premises node may compare the second set of parameters to the first set of parameters to determine whether the second set matches the first set. If the parameters match, the on-premises node may sign cryptographically the operation payload and transmit the operation payload to the computing server for the computing server to broadcast the operation payload to a blockchain to carry out the blockchain operation.

20 Claims, 10 Drawing Sheets

MULTI-PARTY BLOCKCHAIN TRANSACTION APPROVAL WORKFLOW

FIELD

The disclosure generally relates to blockchain operation verification and, more specifically, to the architecture of on-premises nodes for verifying blockchain operations.

BACKGROUND

Blockchains, which may include immutable ledger systems, are becoming an increasingly important component of the global information infrastructure. The advance in blockchain technology widens the scope of blockchain applications to many areas and businesses. As blockchain technology begins to apply in various industries, the technology also faces challenges in the conditions and requirements in those industries. The permissionless and anonymous nature of blockchains could potentially bring various technical challenges when blockchain is applied to certain industries. While blockchains are built with certain foundational principles such as decentralization, security, and transparency, applications of blockchains do not necessarily possess the ability to adhere to those requirements, especially relating to scalability, authorization, and other enterprise controls. For example, current blockchain systems often do not provide sufficiently efficient and secure solutions for extending blockchain built-in security to layer-2 applications that are developed upon underlying blockchain architecture. As additional blockchain protocols are developed, scalability for applications that can interact with different kinds of blockchains while still maintaining the security standard of the blockchains has become a challenging endeavor.

SUMMARY

Embodiments relate to a system including: a computing server including first one or more processors and first memory configured to store a first set of instructions, wherein the first set of instructions, when executed by the first one or more processors, cause the first one or more processors to perform a first set of steps including: receiving a first set of one or more parameters defining a blockchain operation; generating an operation payload based on the first set of one or more parameters; an on-premises node in communication with the computing server, on-premises node the including second one or more processors and second memory configured to store a second set of instructions, wherein the second set of instructions, when executed by the second one or more processors, cause the second one or more processors to perform a second set of steps including: receiving the operation payload from the computing server; decoding the operation payload to extract a second set of one or more parameters reflected in the operation payload; comparing the second set of one or more parameters to the first set of one or more parameters to determine whether the second set matches the first set; signing cryptographically, responsive to the second set matching the first set, the operation payload; and transmitting the operation payload to the computing server for the computing server to broadcast the operation payload to a blockchain to carry out the blockchain operation.

In some embodiments, one or more parameters in the first set defining the blockchain operation include non-dynamic data elements of the blockchain operation.

In some embodiments, the operation payload generated by the computing server includes dynamic data elements that are specific to the blockchain and the operation payload is generated based on both the one or more parameters in the first set and the dynamic data elements.

In some embodiments, the operation payload is in bytecode and decoding the operation payload includes converting the bytecode to a source code.

In some embodiments, decoding the operation payload includes decoding the operation payload in a sandbox environment that is operated in a binary code programming language.

In some embodiments, the on-premises node is provided by the computing server to an organization for the organization to operate the on-premises node on premises.

In some embodiments, the computing server is untrusted from a perspective of the on-premises node so that the on-premises node is configured to compare the second set of one or more parameters to the first set of one or more parameters to verify that the operation payload accurately reflects the blockchain operation.

In some embodiments, the second set of steps further includes: determining that the blockchain operation is governed by a policy; and seeking an authorization of the blockchain operation according to the policy, wherein signing cryptographically the operation payload is performed responsive to the authorization is fulfilled.

In some embodiments, the authorization includes a multi-party authorization, and seeking the authorization of the blockchain operation according to the policy includes: transmitting the one or more parameters defining the blockchain operation to a user client device for authorization; and transmitting, based on the policy, the one or more parameters defining the blockchain operation to a second user device for authorization.

In some embodiments, signing cryptographically the operation payload includes: using a multi-party computation technique to generate a private cryptographic key; and using the private cryptographic key to generate a digital signature for the operation payload.

In some embodiments, a computer-implemented method may include: receiving a blockchain operation request from a user device, the blockchain operation request including a first set of one or more parameters defining a blockchain operation; transmitting the first set of one or more parameters to a computing server, wherein the computing server generates an operation payload of the blockchain operation based on the first set of one or more parameters; receiving the operation payload; decoding the operation payload to extract a second set of one or more parameters reflected in the operation payload; comparing the second set of one or more parameters to the first set of one or more parameters to determine whether the second set matches the first set; signing cryptographically, responsive to the second set matching the first set, the operation payload; and transmitting the operation payload to the computing server for the computing server to broadcast the operation payload to a blockchain to carry out the blockchain operation.

In some embodiments, the operation payload generated by the computing server includes dynamic data elements that are specific to the blockchain and the operation payload is generated based on both the one or more parameters in the first set and the dynamic data elements.

In some embodiments, the operation payload is in bytecode and decoding the operation payload includes converting the bytecode to a source code.

In some embodiments, decoding the operation payload includes decoding the operation payload in a sandbox environment that is operated in a binary code programming language.

In some embodiments, the techniques described herein relate to a computer-implemented method, further including: determining that the blockchain operation is governed by a policy; and seeking an authorization of the blockchain operation according to the policy, wherein signing cryptographically the operation payload is performed responsive to the authorization is fulfilled.

In some embodiments, the authorization includes a multi-party authorization, and seeking the authorization of the blockchain operation according to the policy includes: transmitting the one or more parameters defining the blockchain operation to the user device for authorization; and transmitting, based on the policy, the one or more parameters defining the blockchain operation to a second user device for authorization.

In some embodiments, a computer-implemented method may include: receiving, by a computing server from an on-premises node, a first set of one or more parameters defining a blockchain operation; generating an operation payload based on the first set of one or more parameters; transmitting the operation payload to the on-premises node, wherein the on-premises node is configured to decode the operation payload to extract a second set of one or more parameters reflected in the operation payload and compare the second set of one or more parameters to the first set of one or more parameters to determine whether the second set matches the first set; receiving the operation payload that is cryptographically signed; and broadcasting the operation payload to a blockchain to carry out the blockchain operation.

In some embodiments, generating the operation payload includes: retrieving dynamic data elements that are specific to the blockchain; generating the operation payload based on both the one or more parameters in the first set and the dynamic data elements.

In some embodiments, generating the operation payload includes converting the one or more parameters in the first set to bytecode.

In some embodiments, the cryptographically signed operation payload is signed by a private cryptographic key that is generated by a multi-party computation technique.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and memory coupled to the processors that is configured to store instructions. The instructions, when executed by one or more processors, cause the one or more processors to perform a process that includes steps described in the above computer-implemented methods or described in any embodiments of this disclosure.

Figure 1:
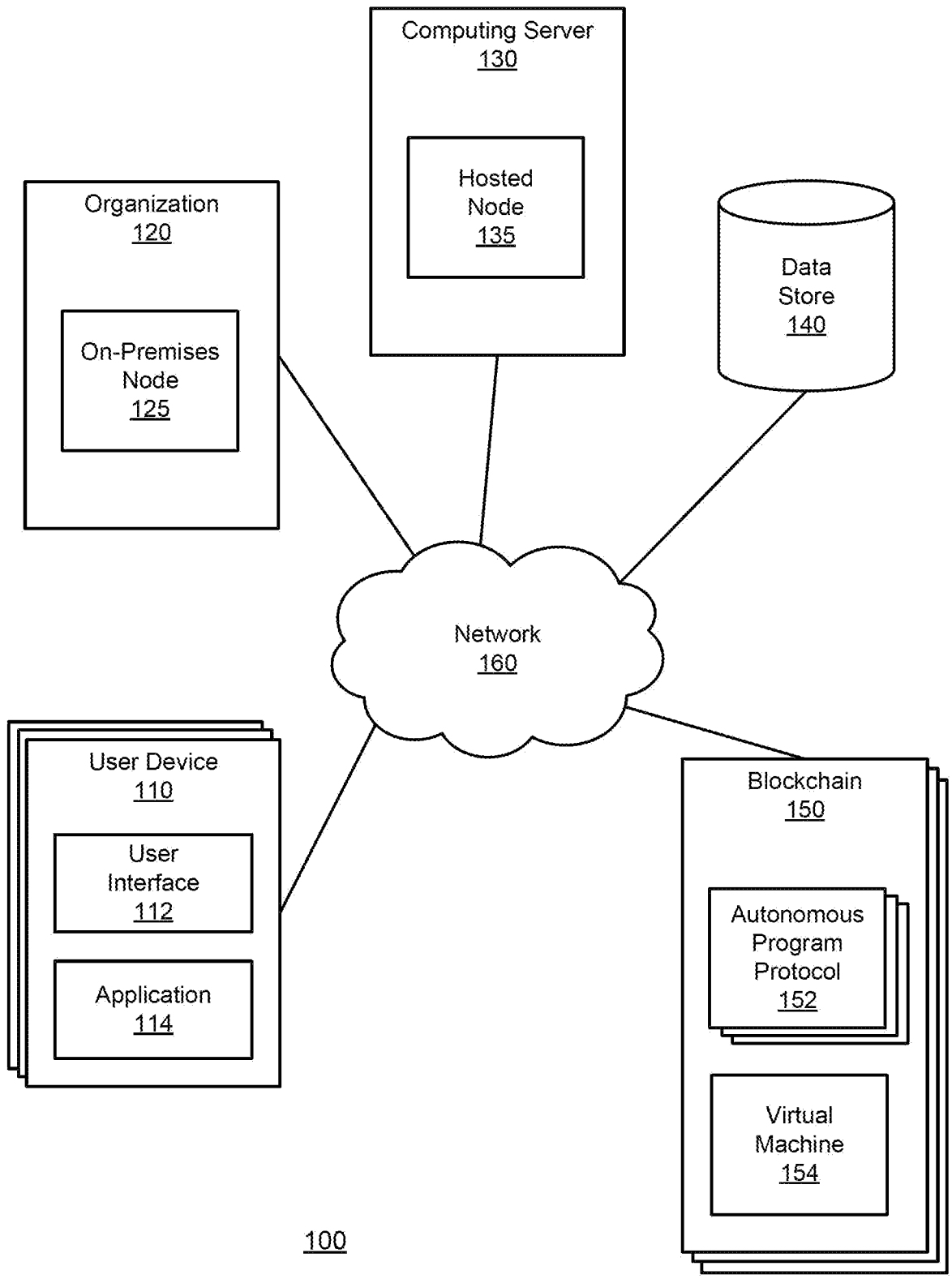
(FIG. 1 is a block diagram that illustrates a system environment of a blockchain communication environment, in accordance with some embodiments.

The figures depict and the detail description describes various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Some embodiments in this disclosure are related to a computer architecture that allows verification and authorization of blockchain operations securely, flexibly, and scalably in a blockchain-agnostic manner. In some embodiments, the computer architecture allows a domain to maintain its own blockchain private cryptographic key and initiate and configure blockchain operation using on-premises resources so that the security and authorization of blockchain operations can be tightly controlled by the domain. In some embodiments, a domain may maintain one or more on-premises nodes in managing blockchain-related operations. A node may receive an operation request that includes one or more parameters that define the operation. The nodes may communicate with an external source that generates an operation payload that is to be broadcasted to a blockchain to carry out a blockchain operation. To ensure the operation payload is not tampered, the node may establish a sandbox environment and decode the payload to extract parameters in the payload to verify that the parameters in the payload match with the parameters specified in the original intent before cryptographically signing the payload. The reliance on an external source to generate a blockchain operation payload and broadcast the payload to a blockchain allows the on-premises node to scale in a secure manner without having to be updated to meet various fast-developing blockchain protocols because the code for generating a broadcast payload is often blockchain specific. Conventionally, the code interacting with the user and the code generating the operation payload are two separate code bases. It is therefore technically possible for the data that was approved by a user and the operation that is ultimately submitted to the blockchain to vary independently. The decoding and verification of the parameters by the on-premises node addresses this issue.

System Overview

FIG. (FIG. 1 is a block diagram that illustrates a system environment 100 of an example blockchain communication environment, in accordance with some embodiments. By way of example, the system environment 100 includes a user device 110, an organization 120 that hosts an on-premises node 125, a computing server 130 that may provide a hosted node 135, a data store 140, a blockchain 150 that has one or more autonomous program protocols 152 stored on the blockchain 150. The entities and components in the system environment 100 communicate with each other through the network 160. In various embodiments, the system environment 100 may include different, fewer, or additional components. The components in the blockchain system environment 100 may each correspond to a separate and independent entity or may be controlled by the same entity. For example, in some embodiments, the computing server 130 may control the data store 140 but, in other embodiments, the computing server 130 and the data store 140 are operated by different entities. Likewise, the computing server 130 and the organization 120 can be different entities.

While each of the components in the system environment 100 is sometimes described in disclosure in a singular form, the system environment 100 may include one or more of each of the components. For example, there can be multiple user devices 110 communicating with the computing server 130 and various blockchain management nodes, such as the on-premises nodes 125 and hosted nodes 135. The organization 120 may typically host more than one on-premises node 125. Likewise, the computing server 130 may typically host more than one hosted node 135. Also, the computing server 130 may provide service for multiple organizations 120, each of which has its own on-premises nodes 125 and multiple users who may operate different user devices 110. While a component is described in a singular form in this disclosure, it should be understood that in various embodiments the component may have multiple instances. Hence, in the system environment 100, there can be one or more of each of the components. Likewise, while some of the components are described in a plural form may also only have a single instance in the system environment 100 in some embodiments.

A user device 110 may also be referred to as a client device. A user device 110 may be controlled by a user who may be the user of the computing server 130, the on-premises node 125, or the hosted node 135. In some situations, a user may also be referred to as an end user, for example, when the user is the organization's customer who uses a software application that is published by the organization 120. In some situations, various users may be employees of the organization 120 and perform blockchain operations under the policies of the organization 120. The user device 110 may be any computing device. Examples of user devices 110 include personal computers (PC), desktop computers, laptop computers, tablet computers, smartphones, wearable electronic devices such as smartwatches, or any other suitable electronic devices.

Blockchain operations may be any suitable operations related to blockchains 150 such as operations that are carried out on a blockchain 150 or an autonomous program protocol 152 of the blockchain 150. Examples of blockchain operations include cryptocurrency or token transactions, causing issuance of a token to a user, staking on a blockchain 150, invoking one or more algorithms of an autonomous program protocol 152, feeding data to an autonomous program protocol 152 through an oracle machine, performing mining or minting in a blockchain 150, participating in a blockchain 150 as a blockchain node, etc. In various situations, blockchain operations may be used interchangeably with blockchain transactions.

In some embodiments, there can be different types of users within an organization 120 in the setting of performing a blockchain operation, depending on the roles of the users in various operations. For example, in a multi-party authorization (MPA) setting for conducting an operation, one user may be an initiator and one or more other users may be approvers. The roles of initiator and approvers may change based on the identity of the initiator, the employee hierarchy of the organization 120, and the policies set forth by the organization 120. A user may also be an administrator of the organization 120 who is responsible for working with the computing server 130 to manage various settings and parameters of one or more nodes of the organization 120.

A user in the system environment 100 may sometimes also be referred to as a named entity. A named entity may represent a user themselves, such as an employee of an organization 120. In some embodiments, a named entity may also be a team, a department, a vendor, a contractor, or another unit of the organization 120. A user in this context may refer to the user themselves or an administrator of the named entity who takes the role of managing the named entity. An organization 120 may maintain a hierarchy of named entities, which contains information about the relationships among the named entities. In the case of an authorization policy situation, such as in an MPA, the hierarchy of the named entities may be used to determine a chain of authorization required to approve an operation. For example, a policy may specify that a transaction over a certain amount from an employee requires the employee's manager approval.

A user device 110 may include a user interface 112 and an application 114. The user interface 112 may be the interface of the application 114 and allow the user to perform various actions associated with application 114. For example, application 114 may be a software application and the user interface 112 may be the frontend. The user interface 112 may take different forms. In one embodiment, the user interface 112 is a software application interface. For example, a business may provide a front-end software application that can be displayed on a user device 110. In one case, the front-end software application is a software application that can be downloaded and installed on a user device 110 via, for example, an application store (App store) of the user device 110. In another case, the front-end software application takes the form of a webpage interface of the organization 120 that allows clients to perform actions through web browsers. The front-end software application includes a graphical user interface (GUI) that displays various information and graphical elements. For example, the GUI may be the web interface of a software-as-a-service (Saas) platform that is rendered by a web browser. In some embodiments, user interface 112 does not include graphical elements but communicates with a server or a node via other suitable ways such as command windows or application program interfaces (APIs).

In the system environment 100, multiple different types of applications 114 may be operated on a user device 110. Those applications 114 may be published by different entities and be in communication with different components in the system environment 100. For example, in some embodiments, a first application 114 may be a software application that is published by the organization 120 for the employees of the organization 120 to perform work-related tasks. In some embodiments, a second application 114 may be a blockchain wallet frontend application that is published by the computing server 130 (or managed by an organization 120) for a user to communicate with the on-premises node 125. In some embodiments, a third application 114 may be a software application for a user to communicate to a blockchain node, which may be a hosted node 135, for the user to gain information about a blockchain 150 or perform a blockchain operation. In some embodiments, a fourth application 114 may be a SaaS platform hosted by the computing server 130 as a web application for an administrator of an organization 120 to manage one or more nodes provided by the computing server 130. These are merely examples of various types of applications 114 that may be operated on a user device 110.

An organization 120, such as an enterprise, may be a customer of the computing server 130 and use different components offered or managed by the computing server 130. An organization 120 may use various products and services provided by the computing server 130. For example, an organization 120 may install one or more on-premises nodes 125 that are provided by and in communication with the computing server 130. In some embodiments, the organization 120 may also use one or more hosted nodes 135 that may be hosted by the computing server 130. The on-premises node 125 and hosted node 135 are blockchain-related nodes that may be used to perform one or more blockchain operations. An organization 120 may set forth one or more policies specifying the authentication and authority requirements for various employees in conducting blockchain operations through the organization 120. The organization 120 may use various products and services provided by the computing server 130 to manage digital assets, maintain private keys for blockchain wallets, such as through multi-party computation provided by the functionalities of a node, operate a wallet system, perform multi-party authorization for operations, and enforce policies set forth by the organization 120. In some embodiments, an organization 120 may delegate one or more tasks (e.g., key management, operation authorization, policy enforcement) to the computing server 130 by using one or more nodes provided by the computing server 130 and/or directly communicating with the computing server 130.

An organization 120 may also be referred to as a domain. In some embodiments, the terms domain and organization may be used interchangeably. A domain refers to an environment for a group of units and individuals to operate and use domain knowledge to organize activities, enforce policies, and operate in a specific way. An example of a domain is an organization, such as a business, an institute, or a subpart thereof, and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

An on-premises node 125 may be a node initially provided by the computing server 130 but may be hosted on-premises in an organization 120 and controlled by the organization 120. The functionalities of an on-premises node 125 may vary depending on embodiments. For example, in some embodiments the on-premises node 125 may have sufficient functionalities to serve as a fully functional blockchain node of a blockchain 150. Yet, in other embodiments, one or more functionalities of an on-premises node 125 may still partially rely on the computing server 130. For example, the on-premises node 125 and the computing server 130 may cooperatively manage one or more private keys of the users of the organization 120 through multi-party computation (MPC) and both the on-premises node 125 and computing server 130 may serve as nodes in the MPC. In another example, an on-premises node 125 may operate in a secure environment within the organization 120 so that the on-premises node 125 is not generally accessible by a public network such as the Internet. In such cases, the on-premises node 125 may be in communication with the computing server 130 and route certain blockchain operation requests to the computing server 130 for performing the operation. The functionalities of the blockchain node may reside in the computing server 130.

The on-premises node 125 may work with the computing server 130 to carry out a blockchain operation. For instance, in carrying out certain blockchain operations, the on-premises node 125 may first route an operation intent that includes the parameters of the operation to the computing server 130. In turn, the computing server 130, based on the current condition of the blockchain 150, may generate a draft of an operation payload that reflects the intent. The operation payload is the payload that is used to carry out the operation. The operation payload may sometimes also be referred to as a broadcast payload because it can be a payload that is used to broadcast to a blockchain 150. The computing server 130 may transmit the operation payload back to the on-premises node 125, which in turn decodes the payload and verifies that the parameters as reflected in the payload still match those in the original intent. The on-premises node 125 may ask a user device 110 to approve the payload or multiple user devices 110 to approve the payload in case of multi-party authorization. Upon proper approval, the payload may be signed and be routed to the computing server 130 for broadcasting to the blockchain 150. Further detail of the operation verification mechanism will be discussed in FIG. 4 through FIG. 6B.

An on-premises node 125 may be a node that is hosted and operated directly by the organization 120. For example, an on-premises node 125 may be run on devices that are controlled by the organization 120. In some embodiments, the on-premises node 125 may be operated by one or more servers of the organization 120. However, the use of a server is not a requirement. An on-premises node 125 may be operated in any device of the organization 120, such as a user device 110 of an employee of the organization 120. Also, an on-premises node 125 does not have to reside in a device that is physically located on the premises of the offices or other physical locations of the organization 120. In some embodiments, on-premises in this context merely refers to the on-premises node 125 being operated by a device that is controlled by the organization 120. In some cases, the device operating an on-premises node 125 may be a mobile device whose physical location is not fixed. In some embodiments, an on-premises node 125 is subject to one or more secure requirements set forth by an organization 120.

In some embodiments, the computing server 130 may provide a software marketplace (e.g., similar to an App store) through a digital distribution platform so that an organization 120 may add additional software components to the on-premises node 125 to expand the functionalities of the on-premises node 125. In some embodiments, each software component may be modularized so that the software component may be added and updated without affecting the system files or other software components of the on-premises node 125. One example of a software component that may be added to the on-premises node 125 is a sandbox that may operate in a secure environment and simulate the operation of a blockchain 150. The sandbox environment may be written in a language such as WEBASSEMBLY (WASM). The detail of the operations and sub-components of an example on-premises node 125 will be further discussed in association with FIG. 3.

In this disclosure, a node may generally refer to a worker of a larger network (e.g., a distributed computing network) of computers that may work together to perform a task. A worker may take the form of a computing device, a virtual machine, or any computing component that has processing power, memory, and storage. A node may execute a task independently, distributedly, or cooperatively with other nodes. A blockchain node is a specific kind of node that participates in a blockchain network 150. A blockchain node may be a node that participates in the validation and processing of operations on the blockchain 150. Depending on the sub-type of a blockchain node, some blockchain nodes may store a copy of the entire blockchain ledger while other nodes may only store a partial copy of the ledger. In some embodiments, the on-premises node 125 and hosted node 135 are nodes that are related to carrying out operations in blockchains and may be referred to as blockchain-related nodes. Blockchain-related nodes and blockchain nodes are different terms in this disclosure. A blockchain-related node may or may not have the full functionality to be compliant with the protocol of a blockchain 150 to serve as a blockchain node. Depending on the functionalities of a node in various embodiments, an on-premises node 125 or a hosted node 135 may include sufficient functionalities to serve as a blockchain node of a blockchain 150.

A computing server 130 may be a server that provides functionalities and services to organization customers for managing various blockchain-related nodes, providing API for data of blockchains 150, assisting in managing (or being delegated to manage) private keys of organizations 120, providing access control features for an organization 120 to manage access to a blockchain based on policies of the organization 120, and other blockchain-related services. The computing server 130 may also be referred to as a remote server. While the computing server 130 is referred to as a server, for simplicity, the computing server 130 may also encompass the company that operates the computing server 130. The services provided by the computing server 130 may include access control, operation verification, sandbox environment, blockchain node, authentication, authorization, and other suitable compliance (e.g., Know Your Customers KYC) services. The detail of the operations and sub-components of the computing server 130 will be further discussed in association with FIG. 2.

While the computing server 130 is described in a singular form, the computing server 130 may include one or more computers that operate independently, cooperatively, and/or distributedly. For example, in various embodiments, the computing server 130 may take different suitable forms. In some embodiments, the computing server 130 may be a server computer that includes one or more processors and memory that stores code instructions that are executed by the one or more processors to perform various processes described herein. In some embodiments, the computing server 130 may be a pool of computing devices that may be located at the same geographical location (e.g., a server room) or be distributed geographically (e.g., clouding computing, distributed computing, or in a virtual server network). In some embodiments, the computing server 130 may be a collection of servers that independently, cooperatively, and/or distributedly provide various products and services described in this disclosure. The computing server 130 may also include one or more virtualization instances such as a container, a virtual machine, a virtual private server, a virtual kernel, or another suitable virtualization instance. The computing server 130 may provide organizations 120 with various blockchain services as a form of nodes in addition to cloud-based software, such as software as a service (Saas), through the network 160.

A hosted node 135 may be a node that is hosted by the computing server 130 for performing blockchain-related services on behalf of an organization 120. For example, a hosted node 135 may be a node that is dedicated to an organization 120. The computing server 130 may provide a management platform such as a SaaS platform for an organization 120 to manage the preferences and parameters of the hosted node 135 while the hosted node 135 is operated by the computing server 130. In some embodiments, the functionalities of a hosted node 135 may be similar to those of an on-premises node 125. An on-premises node 125 may provide full control and a higher level of security for an organization 120 while a hosted node 135 may be more flexible in terms of upgrades and updates and also delegate the operation of a node to the computing server 130. An organization 120, depending on its needs and situations, may select to use only on-premises nodes 125, a mix of on-premises nodes 125 and hosted nodes 135, or only hosted nodes 135.

The data store 140 includes one or more storage units such as memory that takes the form of a non-transitory and non-volatile computer storage medium to store various data. The computer-readable storage medium is a medium that does not include a transitory medium such as a propagating signal or a carrier wave. The data store 140 may be used by the computing server 130 to store data related to the computing server 130, such as policies of various organizations 120, parameters of various nodes, and other information related to various blockchains 150. In one embodiment, the data store 140 communicates with other components by the network 160. This type of data store 140 may be referred to as a cloud storage server. Examples of cloud storage service providers may include AMAZON AWS, DROPBOX, RACKSPACE CLOUD FILES, AZURE, GOOGLE CLOUD STORAGE, etc.

In another embodiment, instead of a cloud storage server, the data store 140 is a storage device that is controlled and connected to the computing server 130. For example, the data store 140 may take the form of memory (e.g., hard drives, flash memory, discs, ROMs, etc.) used by the computing server 130 such as storage devices in a storage server room that is operated by the computing server 130.

A blockchain 150 may be a public blockchain that is decentralized, a private blockchain, a semi-public blockchain, an execution layer settling data on a public blockchain (e.g., Layer 2 blockchains, rollups), or an application-specific chain. A blockchain 150 may include a ledger that records transactions, code instructions, and other information associated with various blockchain addresses. A blockchain network includes a plurality of blockchain nodes that cooperate to verify transactions and generate new blocks. In some implementations of a blockchain, the generation of a new block may also be referred to as a proposal process that is based on a consensus mechanism, which may be a mining process (e.g., proof of work) or a validation process (e.g., proof of stake). A blockchain 150 may be a new blockchain or an existing blockchain such as BITCOIN, ETHEREUM, EOS, NEAR, SOLANA, AVALANCHE, etc. The system environment 100 may include one or more blockchains 150. A blockchain 150 includes a plurality of blockchain nodes. Each blockchain node may include one or more processors. The processors in various nodes may independently or cooperatively execute various blockchain processes such as generating blocks, reaching consensus, and executing code instructions that are stored on the blockchain 150.

Some of the blockchains 150 support autonomous program protocol 152, which is a set of code instructions that are stored on a blockchain 150 and are executable when one or more conditions are met. Examples of autonomous program protocols 152 include token contracts, smart contracts, Web3 applications, autonomous applications, distributed applications, decentralized applications (dApps), decentralized finance (DeFi) applications, protocols for decentralized autonomous organizations (DAOs), protocols that generate non-fungible tokens (NFTs), decentralized exchanges, blockchain gaming, metaverse protocols, and other suitable protocols and algorithms that may be recorded on a blockchain. Smart contracts may be examples of autonomous program protocols 152 that may be executable by a computer such as a virtual machine 154 of the blockchain 150. Here, a computer may be a single operation unit in a conventional sense (e.g., a single personal computer), a resource of the blockchain such as a virtual machine 154, or a set of distributed computing devices that cooperate to execute the code instructions (e.g., a distributed computing system). An autonomous program protocol 152 includes a set of instructions. The instructions, when executed by one or more processors, cause one or more processors to perform steps specified in the instructions. The processors may correspond to a blockchain node of the blockchain 150 or may be distributed among various nodes of the blockchain 150.

A virtual machine 154 is a resource unit of a blockchain 150. A virtual machine 154 may be a standardized software execution environment that emulates the functionality of a physical machine and allows for the execution of autonomous program protocol 152 on the virtual machine 154. A virtual machine 154 may be run by any blockchain node. In some embodiments, a virtual machine 154 may take the form of a sandboxed environment that is created within the blockchain network to execute autonomous program protocol 152. The autonomous program protocols 152 are compiled into bytecode that can be executed by the virtual machine. One example of the virtual machine 154 Ethereum Virtual Machine (EVM) that executes the programming language SOLIDITY. In some embodiments, a virtual machine 154 may operate based on binary instruction language such as WEBASSEMBLY that can be executed in a variety of environments, such as web browsers. An example of such a virtual machine 154 is Ethereum WebAssembly (EWASM) which may allow programmers to build autonomous program protocols 152 using various common programming languages.

The communications among a user device 110, an organization 120, the computing server 130, a hosted node 135, and the blockchain 150 may be transmitted via a network 160. The network 160 may be a public network such as the Internet. In one embodiment, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet switching networks such as the Internet.

Example Computing Server

Figure 2:
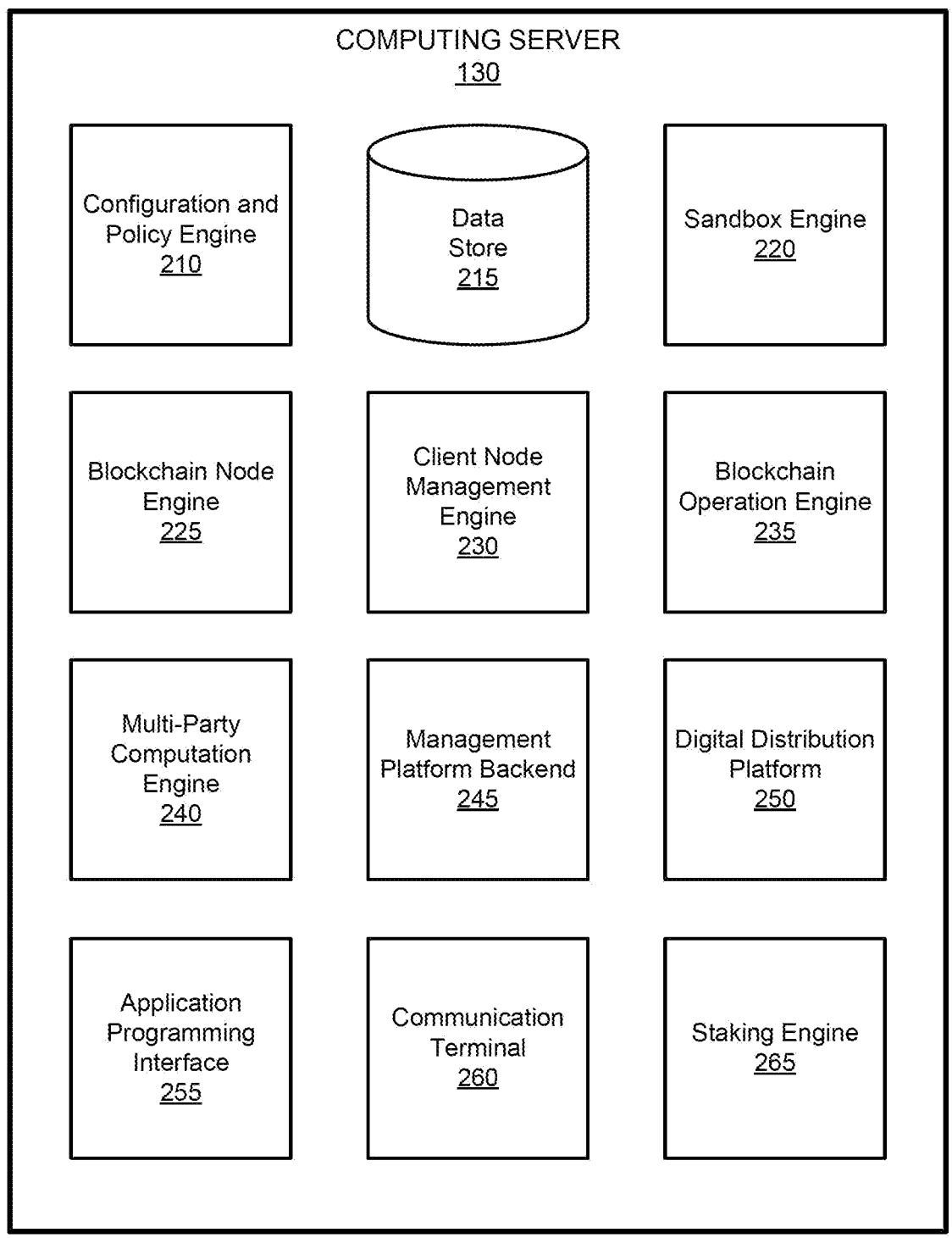
FIG. 2 is a block diagram representing an example computing server, in accordance with some embodiments.

FIG. 2 is a block diagram representing an example computing server 130, in accordance with some embodiments. In the embodiment shown in FIG. 2, the computing server 130 includes configuration and policy engine 210, data store 215, sandbox engine 220, blockchain node engine 225, client node management engine 230, blockchain operation engine 235, multi-party computation engine 240, management platform backend 245, digital distribution platform 250, application programming interface (API) 255, communication terminals 260, and a staking engine 265. The functions of the computing server 130 may be distributed among different components in a different manner than described below. Also, in various embodiments, the computing server 130 may include different, fewer, and/or additional components.

While the computing server 130 is used in a singular form, the computing server 130 may include one or more computers that include one or more processors and memory. The memory may store computer code that includes instructions. The instructions, when executed by one or more processors, cause the processors to perform one or more processes described herein. The computing server 130 may take different forms. In some embodiments, the computing server 130 is a single computer that executes code instructions directly. In some embodiments, the computing server 130 is a group of computing devices that communicate with each other. The computing devices may be located geographically at the same (e.g., in a server room) or in different locations. In some embodiments, the computing server 130 includes multiple nodes that operate in a distributed fashion such as in cloud computing or distributed computing. Each node may include one or more computing devices operating together. In some cases, the computing server 130 may also include virtual machines. In some embodiments, each component in FIG. 2 may be operated by a separate server and the computing server 130 may serve as the collective term of those servers. Any computing devices, nodes, or virtual machines, singular or plural, may simply be referred to as a computer, a computing device, or a computing server. Components of the computing server 130 shown in FIG. 2, individually or in combination, may be a combination of hardware and software and may include all or a subset of the example computing system illustrated and described in FIG. 8.

In some embodiments, the configuration and policy engine 210 may store and determine policy rules for various participants in an organization 120 for the use of organizational resources to conduct operations, such as blockchain operations. A policy may be defined by an organization 120 or automatically added or defined by the computing server 130 based on certain default settings. An organization 120 may transmit the policy setting to, or build the policy at, a policy management platform (e.g., a SaaS platform) operated by the computing server 130. The configuration and policy engine 210 translates the policy to suitable parameters, conditions, and triggers that are maintained by the computing server 130. The policies may be of different suitable natures, such as requirements related to authentication, identity verification, authorization, access control, and compliance. Based on the policies specified by an organization 120, the computing server 130 may adjust one or more nodes (e.g., an on-premises node 125 and a hosted node 135) for the organization 120 to provide authorization requirements, security, protection and access control to a blockchain 150, such as an autonomous program protocol 152 recorded on the blockchain 150. An organization 120 may specify one or more access control settings that define various criteria for completing operations with an autonomous program protocol 152. For example, the access control settings may define who can gain access to an autonomous program protocol 152 and the manner of how a party may access the autonomous program protocol 152. The settings may define authorization and an access control list that may be specific to a blockchain 150, an autonomous program protocol 152, a transaction amount, and/or an operation type. For example, a policy of an organization 120 may specify an approval process for performing certain operations as may be defined by the organization 120 as sensitive, such as adding a user, staking in a blockchain 150, transferring cryptocurrency, etc. The policy may define a threshold requirement for an initiator to initiate the operation and an approval flow for the operation, such as a multi-party authorization workflow that requires one or more approvers to authorize the operation.

A policy may be generic or specific. A specific policy may be a policy that is customized by an organization 120 and is specific to a certain named entity, a type of operation, a transaction threshold, and/or another criterion. A specific policy defines a specific rule with respect to an operation that meets certain criteria. For example, an organization 120 may define a multi-party authorization workflow that requires a manager to approve an employee's initiation of an operation that is categorized by the organization 120 as sensitive. In contrast, a generic policy may be a policy that is commonly applied to many operations, such as a threshold amount for transactions that exceed the threshold. The configuration and policy engine 210 may include or suggest default rules for a generic policy and may enforce a generic policy for various autonomous program protocols 152 based on the selections of an organization 120. A policy may also preapprove an operation based on certain conditions, require authorization before an operation is approved, and/or impose certain reporting requirements after the operation is carried out. A policy may also be ruled based or dynamic. For example, a policy may be carried out by a machine learning model that does not have a very specific and fixed rule on defining a policy.

In some embodiments, policies may be cryptographically enforced. In some embodiments, blockchain operations are signed as policy compliant after the applicable policies have been enforced. Operation approvals can be conducted using programmatic APIs, manual approvers, or a combination of both. In some embodiments, an organization 120 may specify policies and associated conditions through a user-friendly platform provided by the computing server 130. The configuration and policy engine 210 translates the policies to the appropriate parameters and conditions and transmits the policies to an on-premises node 125 for the policy to be cryptographically enforced. In some embodiments, the policies may be stored on-premises of the organization 120 as discussed in further detail below in association with the configuration and policy engine 310 operated by the on-premises node 125.

In some embodiments, the data store 215 is a database that stores various information with respect to settings provided by customers of the computing server 130, such as organizations 120. The data stored may include profiles of organization customers, named entity hierarchies of organizations 120, node settings of the customers, and various policies associated with blockchain operations specified by the customers. The data store 215 may also include or be in communication with a credential vault that stores user identifiers and passwords and the computing server 130 may perform authentication of a customer. The data store 215 may also store data and metadata related to various operations involving an autonomous program protocol 152. For example, the computing server 130 may have the functionalities of serving as blockchain nodes of various blockchains 150. Various information related to a blockchain 150, such as the full ledgers of the blockchain 150, may also be stored in data store 215 to allow an inquirer to query for information on the blockchain 150, such as through the API 255.

In some embodiments, a sandbox engine 220 may provide a sandbox environment that allows a party that attempts to invoke one or more function calls of an autonomous program protocol 152 to simulate the operation at the computing server 130 first before actually invoking the autonomous program protocol 152 recorded on a blockchain 150. The sandbox environment may be a secure and isolated execution environment such as an isolated virtual machine that can be run without direct access to the underlying system resources so that any code run in the sandbox environment cannot access or modify any resources outside of the sandbox's allocated space or impact the main blockchain network. For example, a party may have an operation request that is to be sent to an autonomous program protocol 152 for execution. The party may use the sandbox engine 220 to simulate the result of the autonomous program protocol 152 carrying out the request and determine whether the result generates the desirable outcome and/or whether the result generates any undesirable side-effects. In some embodiments, the sandbox engine 220 allows an organization 120 to evaluate the operations and administrations of a blockchain wallet to be maintained by the on-premises node 125. One or more policies specified by the organization 120 may also be tested in the sandbox engine 220.

In some embodiments, the blockchain node engine 225 provides the functionalities for one or more computing devices of the computing server 130 to serve as blockchain nodes of various blockchains 150. A blockchain node may be a node that participates in the validation and processing of operations on the blockchain 150. Depending on the sub-type of a blockchain node, some blockchain nodes may store a copy of the entire blockchain ledger while other nodes may only store a partial copy of the ledger. The cryptographic key management engine 225 may maintain up-to-date functionalities to meet the current protocol requirements of various blockchains 150 so that the devices of the computing server 130 may continue to serve as blockchain nodes for blockchains 150. A customer of the computing server 130 may use a blockchain node maintained by the blockchain node engine 225 in various contexts. For example, a blockchain node may include the information of the ledger of a blockchain 150 and the customer may query the blockchain node engine 225 to retrieve information related to the blockchain 150 through an API call. In some embodiments, an on-premises node 125 may not have the full functionalities of a blockchain node or may not be fully updated to be compliant with the protocol requirements of a blockchain 150. An organization 120 may conduct blockchain operations by using an on-premises node 125 to reach the blockchain node engine 225. The blockchain node engine 225 may also provide the computing server 130 with access and information to various blockchains 150.

In some embodiments, a client node management engine 230 may manage the hosted nodes 135 of the customers of the computing server 130 and may set the initial settings of the on-premises nodes 125 before an on-premises node 125 is deployed to an organization 120. The computing server 130 may provide a node management platform for an organization 120 to adjust the settings of a node. Based on the settings, the client node management engine 230 may adjust the parameters and functionalities of the nodes associated with the organization 120. In some embodiments, a hosted node 135 and an on-premises node 125 may have different functionalities and updates of those two different types of nodes may be different. For example, a hosted node 135 may be run at the computing server 130 and may be updated instantly and dynamically based on the settings of the organization 120. An on-premises node 125 may be run at a device of the organization 120 and the organization 120 may adjust the on-premises node 125 directly or receive update installation packages that will change the on-premises node 125.

In some embodiments, the blockchain operation engine 235 may carry out and participate in carrying out various blockchain operations that are requested by customers, such as blockchain transactions, staking requests, and usages of autonomous program protocols 152. The blockchain operation engine 235 may generate the payload of the operation that is to be broadcasted to a blockchain 150. The payload may be referred to as an operation payload or a broadcast payload. Depending on embodiments with respect to where the private key is saved, if the computing server 130 is in the custody of the private key on behalf of a customer, the blockchain operation engine 235 may sign the payload and broadcast the operation through one of the blockchain nodes. In some embodiments, an organization customer has custody of the private key. In such a case, the blockchain operation engine 235 may transmit the unsigned payload to an on-premises node 125 for the on-premises node 125 to verify and sign the payload. For example, the blockchain operation engine 235 may be used to generate a payload that is sent to an on-premises node 125 for verification of the operation intents before one or more relevant parties sign the payload using private keys. The blockchain operation engine 235 may retrieve dynamic data elements that may be required to broadcast an operation to a blockchain 150. The dynamic data elements may be retrieved from a blockchain node. Based on the dynamic data elements that are dependent on the current conditions of the blockchain 150 and the non-dynamic data elements that are provided as part of the operation intent transmitted by the on-premises node 125, the blockchain operation engine 235 may generate an unsigned payload and transmit the payload to the on-premises node 125 for verification. Depending on the protocol of a blockchain 150, the payload may be in the format of bytecode.

In some embodiments, a multi-party computation (MPC) engine 240 provides or participates in MPC operations. The multi-party computation engine 240 may serve as a node in an MPC network where a group of nodes jointly perform computation without revealing the inputs of the nodes to each other. MPC may be used to securely generate a private key. By using MPC, the private key can be generated without any node possessing the entire key, thereby improving security and preventing any single point of failure. In some embodiments, any one of the multi-party computation engine 240, on-premises node 125, or hosted node 135 may participate in an MPC operation. In some embodiments, the computation of a private key may completely occur within an organization 120 so that the multi-party computation engine 240 operated by the computing server 130 is not involved. In some embodiments, the multi-party computation engine 240 operated by the computing server 130 may store part of the shard of a private key and the MPC is conducted using a few on-premises nodes 125 and the multi-party computation engine 240. U.S. Pat. No. 10,803,194, patented on Oct. 13, 2023, entitled "System and a Method for Management of Confidential Data," is incorporated by reference herein for all purposes.

In some embodiments, a management platform backend 245 may maintain the backend component of one or more management platforms (e.g., SaaS platforms) that allow organizations 120 to create policies, manage client nodes, and perform other actions related to the services provided by the computing server 130. For example, the computing server 130 may provide a SaaS platform with a user-friendly front-end graphical user interface (GUI) that is rendered in a web browser. The front-end GUI is in communication with the management platform backend 245 that stores various inputs and settings provided by an organization 120. The SaaS platform may also allow organizations 120 to manage client nodes and perform other actions associated with the computing server 130. In some embodiments, the management platform backend 245 may additionally be associated with one or more APIs. An organization 120 may directly adjust policies and node settings through one or more API calls instead of going through a GUI.

In some embodiments, a digital distribution platform 250 may take the form of a software marketplace that allows an organization 120 to add one or more software applications to a client node (e.g., an on-premises node 125 or a hosted node 135) to expand the functionalities of the client node. For example, a user of the organization 120 may browse and select various applications of the digital distribution platform 250. For the applications that are selected by the organization 120, the code of the selected applications is incorporated into a client node to expand the functionalities and features of the client node. For example, an on-premises node 125 may initially include certain basic functionalities, such as one or more components that will be described in further detail in FIG. 3. An organization 120 may expand the functionalities of the on-premises node 125 by adding one or more software applications. In one case, an initial on-premises node 125 may not initially come with a sandbox environment such as a WASM module. The organization 120 may add such functionality through the selecting software application listed in the digital distribution platform 250. Each software application may be modularized so that the update of an individual software application typically does not affect the rest of the on-premises node 125. The use of modularized software application may allow an organization 120 to fully control the operation of the on-premises node 125 and expand and update the functionalities through adding or updating a software application downloaded from the digital distribution platform 250. In some embodiments, the digital distribution platform 250 may be open or semi-open to various third-party developers to list their software applications that can be incorporated into a client node. For example, the computing server 130 may operate a blockchain node management ecosystem that allows other participants to design and list their software applications in the digital distribution platform 250.

In some embodiments, an application programming interface 255 allows a party to communicate with and access the functionalities of the computing server 130 directly through a programming language. For example, the computing server 130 may operate blockchain nodes and store ledgers of blockchains 150. A user may query the information of a blockchain 150 through an API call. In some embodiments, a user may also conduct a blockchain operation through a blockchain node operated by the computing server 130. The user may use an API call to initiate the operation request. In some embodiments, a user may also subscribe to the API 255. For example, the notifications can be provided in the form of pull notifications by conventional API in which the recipient may continuously poll the API. In some embodiments, the notifications can be provided through webhook, which may be a form of push API notifications where the computing server 130 automatically transmit the API notifications to the recipient when a matching event has occurred. An API notification, such as a webhook notification, may include a header and a payload. The payload may be in the format of key-value pairs that are in the format of JSON, XML, YAML, CSV, or another suitable format.

In some embodiments, a communication terminal 260 of the computing server 130 may provide network and blockchain connections between the computing server 130 and various entities that communicate with the computing server 130. The computing server 130 may serve as a node of various blockchains to provide up-to-date information about the state of the blockchain. The computing server 130 may include different terminals such as blockchain terminal, asset exchange terminal, and messaging application terminal. Each terminal may manage a data feed or a webpage that publishes information regarding the related services and server status. Each terminal may also include its individual API. A communication terminal 260 may also include an oracle machine that may serve as a data feed for an autonomous program protocol 152. The oracle machine may receive different data from various sources. For example, different parties may provide information and data to the oracle machine. When relevant information is obtained by the oracle machine, some code instructions of the autonomous program protocol 152 may be triggered if certain conditions are met.

In some embodiments, a staking engine 265 may allow a party to stake cryptocurrency in a blockchain 150 to participate in the consensus mechanism of a blockchain 150 that uses proof of stake. In staking, participants hold a certain amount of cryptocurrency as a stake in a blockchain 150. The participants use the amount as collateral to participate in block validation. By staking the cryptocurrency, participants usually receive rewards when new blocks are validated in the blockchain 150. In some embodiments, customers of the computing server 130 may delegate the cryptocurrency holdings to a pool of blockchain nodes who are responsible for validating transactions and creating new blocks on the blockchain 150. The staking engine 265 may provide a dashboard that includes information about staking performance and rewards. In some embodiments, staking of cryptocurrency of an organization 120 may require an authorization process such as a multi-party authorization that is discussed in this disclosure.

Example Client Node

Figure 3:
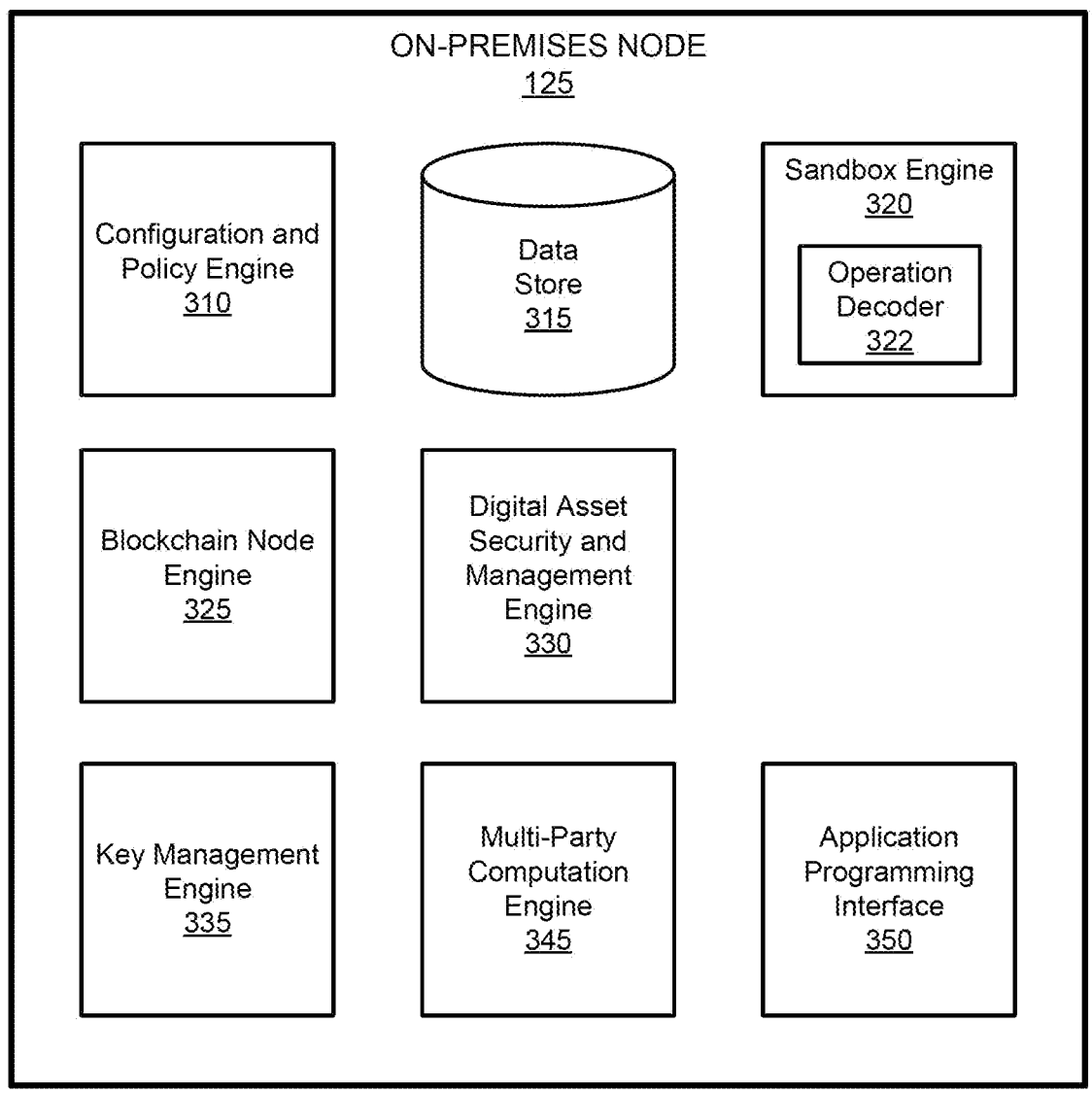
FIG. 3 is a block diagram illustrating an example on-premises node, in accordance with some embodiments.

FIG. 3 is a block diagram representing an example on-premises node 125, in accordance with some embodiments. In the embodiment shown in FIG. 3, the on-premises node 125 may include a configuration and policy engine 310, data store 315, sandbox engine 320, blockchain node engine 325, digital asset security and management engine 330, key management engine 335, staking engine 340, multi-party computation engine 345, and API 350. The functions of the on-premises node 125 may be distributed among different components in a different manner than described below. Also, in various embodiments, the on-premises node 125 may include different, fewer, and/or additional components. For example, an on-premises node 125 may initially include fewer components and an organization 120 may expand the functionalities of the on-premises node 125 by adding software components to the on-premises node 125 from the digital distribution platform 250.

In some embodiments, a hosted node 135 may also have the functionalities and components described in FIG. 3. The functionalities and components of an on-premises node 125 and those of a hosted node 135 may be the same or different. The discussion of the on-premises node 125 may equally apply to a hosted node 135 and is not repeated in this disclosure for the hosted node 135, except for the differences already noted in the rest of the disclosure.

In some embodiments, a configuration and policy engine 310 may be a node-side policy management engine whose functionalities and usages are the same or very similar to those of the configuration and policy engine 210. An on-premises node 125 may provide a policy management platform for an organization 120 to establish policies associated with any blockchain operations. In some embodiments, a policy specified by an organization 120 may be stored on-premises and may be cryptographically enforced. For example, the configuration and policy engine 310 may possess a private cryptographic key, either through storing the private key secretly in a conventional sense or through the ability to re-generate the private key through MPC. An operation that is in compliance with one or more policies is signed by the configuration and policy engine 310 using the private key to indicate policy compliance.

In some embodiments, a data store 315 may be a node-side data store whose functionalities and usages are the same or very similar to those of the data store 215. The data stored may include any suitable information related to the organization 120, node settings of the on-premises node 125, policies associated with the blockchain operations of the organization 120, and part of the shards of private cryptographic keys that may be used in MPC to generate one or more private keys.

In some embodiments, a sandbox engine 320 may be a node-side sandbox engine whose functionalities and usages are the same or very similar to those of the sandbox engine 220. The sandbox engine 320 allows a user to perform testing and simulation using the on-premises node 125. In some embodiments, the sandbox engine 320 may be designed using code language that uses binary instructions such as WASM so that a secure and isolated execution environment may be established on the on-premises node 125 without affecting the security of the rest of the on-premises node 125. The sandbox engine 320 may be built using a blockchain specific code (typically a higher-level language) and be cross-compiled into a binary instruction format such as WASM so that the sandbox engine 320 has the capability to operate using the blockchain specific code while is not limited to only the blockchain specific code.

In some embodiments, the sandbox engine 320 may include an operation decoder 322. The operation decoder 322 has the capability of decoding blockchain codes to other types of codes such as more human-readable parameters. In some embodiments, the operation decoder 322 may receive an operation payload of an operation. The operation payload is typically in bytecode. The operation decoder 322 may decode the payload to generate parameters of the operation by converting the bytecode back into human-readable parameters. The parameters as reflected in the operation payload may be compared to the parameters in the original operation intent to see if the two sets of parameters match each other. The operation decoder 322 may be run on a binary language environment provided by the sandbox engine 320. The bytecode of the operation payload may be compiled from a source code that is using a higher-level language such as SOLIDITY, VYPER, or any programming language that is used by a specific blockchain 150. The sandbox engine 320 may simulate the programming language and decode the bytecode back to source code parameters.

In some embodiments, a blockchain node engine 325 may be a node-side blockchain node whose functionalities and usages are the same or very similar to those of the blockchain node engine 225. In some embodiments, an organization 120 may decide to not use an on-premises node 125 as a blockchain node, such as by isolating the on-premises node 125 from the general Internet due to security reasons. In such embodiments, the blockchain node engine 325 may not directly communicate with other nodes on a blockchain 150. Instead, any blockchain operations may be transmitted to the computing server 130 before the operations are broadcasted to a blockchain 150. In other embodiments, the blockchain node engine 325 may have the functionality of a blockchain node and serves as one of the blockchain nodes of a blockchain 150. An organization 120 may have full control over the extent of functionalities of the on-premises node 125.

In some embodiments, a digital asset security and management engine 330 may allow an organization 120 to establish an on-premises blockchain wallet system for the organization 120. The wallet system may reside within the organization 120 to allow the organization 120 to have full control of the wallet system. The digital asset security and management engine 330 may allow the organization to customize the wallet system and enforce one or more policies on the operations of the wallet system. The digital asset security and management engine 330 may operate with the key management engine 335 and the multi-party computation engine 345 to provide an MPC vault for storing private cryptographic keys in an MPC secure fashion. The API 350 of one or more on-premises nodes 125 allows individual users of the organization 120 to access the wallet system so that the digital asset security and management engine 330 may provide an institutional-grade Wallet as a Service (WaaS) to the users. An organization 120 may also choose to operate an on-premises node 125 as an "offline" node that is not accessible by the general Internet. In such a case, the wallet system established by the digital asset security and management engine 330 may provide a cold wallet to the organization 120.

In some embodiments, the digital asset security and management engine 330 may establish a wallet system by enforcing one or more policies of the organization 120 managed by the 310, verify a proposed blockchain operation involving the wallet system by verifying the intents, and using the key management engine 335 to sign the operation that is authorized. For example, an initiator user may initiate an operation request that includes a list of intent parameters, such as the blockchain network, the transaction amount, the source address, the destination address, etc. The digital asset security and management engine 330 may check whether the operation request is in compliance with one or more policies that are applicable to the operation request by comparing the intent parameters to the conditions and parameters of the policies. Upon verifying that the operation request is in compliance, the digital asset security and management engine 330 may transmit the operation request that includes the list of intent parameters to the computing server 130 to generate an un-signed operation payload of the operation. Since the on-premises node 125 may be treated by the organization 120 as a tightly managed secure environment, the computing server 130 may be treated as an untrusted source because the communications with the computing server 130 are through the Internet and may be tampered with. The un-signed operation payload may be transmitted to the digital asset security and management engine 330. In turn, the digital asset security and management engine 330 uses the operation decoder 322 of the sandbox engine 320 to decode the payload to extract the intent parameters as reflected in the payload. The digital asset security and management engine 330 may compare those extracted intent parameters to the original intent parameters in the operation request. If the intent parameters match, the digital asset security and management engine 330 may determine whether there is a policy governing the authorization of the operation. For example, in some embodiments, an operation may require multiple parties' authorization, such as from the initiator and one or more additional approvers. The digital asset security and management engine 330 uses the key management engine 335 to seek authorization and signatures from the approvers. In some cases, the configuration and policy engine 310 may also provide a signature to indicate that the operation is in compliance with the policies of the organization 120. After one or more signatures are obtained, the digital asset security and management engine 330 may send the signed operation payload to the computing server 130, which may serve as a blockchain node to broadcast the operation to a blockchain 150.

In some embodiments, a key management engine 335 may store and manage one or more cryptographic private keys for various users of an organization 120 to allow users of the organization 120 to participate in various blockchains and to generate digital signatures for various blockchain operations such as requests to access autonomous program protocols 152. The cryptographic key management engine 335 stores various private cryptographic keys of the organization 120. In some embodiments, the key management engine 335 may store a private key by storing the entire string of the private key secretly in a conventional sense. In some embodiments, a key management engine 335 may store a shard of a fragment of a private key for MPC to generate a private key. For example, the organization 120 may operate multiple on-premises nodes 125 and the key management engine 335 of each node may store a shard of a respective fragment of the private key. In some embodiments, upon retrieving a private key, the key management engine 335 may generate a digital signature on behalf of a key owner. In some embodiments, the key management engine 335 may also have the capability of generating a new pair of private and public cryptographic keys. For example, the organization 120 may have a new user and the key management engine 335 may generate a new key pair. The private key is kept secretly while the public key may be published to a blockchain 150 or a certificate authority.

In some embodiments, an MPC engine 345 may be a node-side MPC engine whose functionalities and usages are the same or very similar to those of the multi-party computation engine 240. In some embodiments, a private key of an organization 120 may be entirely controlled by the organization 120. For example, the organization 120 may operate multiple on-premises nodes 125 and each on-premises node 125 may use the MPC engine 345 to cooperatively generate the private key. In some embodiments, the MPC operation may include one or more on-premises nodes 125 and a node from outside of the organization 120, such as the computing server 130 or a hosted node 135. The flexibility allows the organization 120 to decide how to most securely store its private keys based on the situations of the organization 120.

In some embodiments, an API 350 may have functionalities and usages that are the same or very similar to those of the API 255. The API 350 may be used to serve users of the organization 120. For example, the API 350 may be used for user devices 110 to communicate with the wallet system maintained by the digital asset security and management engine 330.

Example Operation Verification Process

Figure 4:
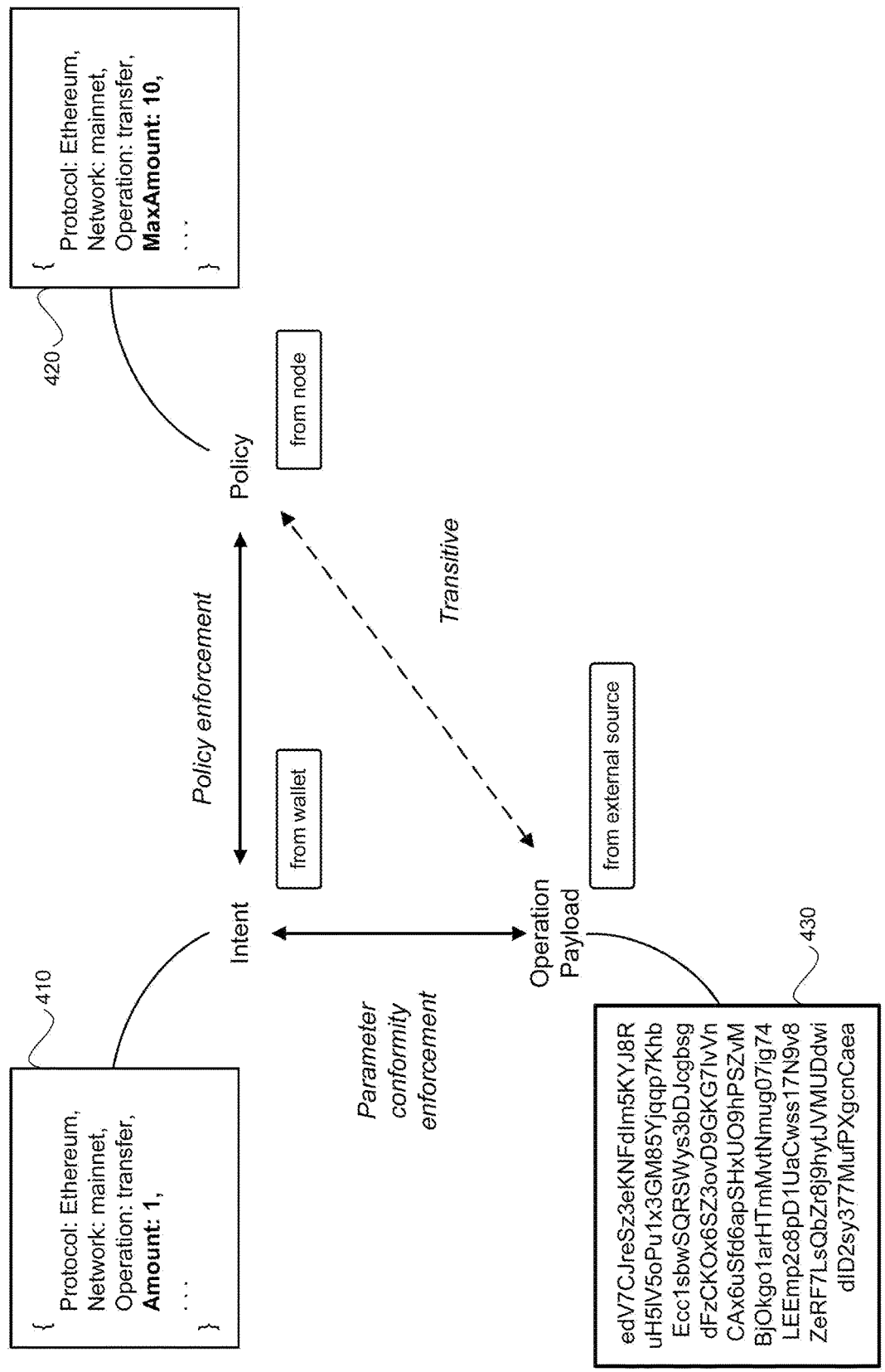
FIG. 4 is a conceptual block diagram illustrating the relationships among different elements in a blockchain operation verification process, in accordance with some embodiments.

FIG. 4 is a conceptual block diagram illustrating the relationships among different elements in a blockchain operation verification process, in accordance with some embodiments.

A blockchain operation may be initiated by a user who may specify the intent of the operation. The intent defines the blockchain operation request, which includes a set of one or more parameters defining a blockchain operation. The parameters in the intent are typically non-dynamic data elements, such as data elements that do not depend on the dynamic state of a blockchain 150. For example, examples of parameters may be specified in a blockchain operation request may include the protocol (type of blockchain 150), the network (e.g., network available for a specific blockchain 150), the type of operation (e.g., transfer, staking, smart contract operation, etc.), the transaction amount, the source blockchain address, the destination blockchain address, etc. These are parameters that substantively define the blockchain operation. In some embodiments, one or more parameters may correspond to the input arguments of an autonomous program protocol 152 (e.g., a smart contract). For example, an autonomous program protocol 152 may take four arguments as inputs. The parameters may be the values of those four arguments.

In some embodiments, below is an example set of parameters that may be used to define an intent of a blockchain operation. The set "execTransaction" (e.g., a request to execute a transaction) may include {address to, uint256 value, bytes data, uint8 operation, uint256 safeTxGas, uint256 baseGas, uint256 gasPrice, address gasToken, address refundReceiver, bytes signatures}. An operation intent, which may be signed by an on-premises node 125, can be generated such that non-dynamic (nOnce) data elements can be described. An example data structure that would model the operation intent may take the form of the following data object that includes a set of parameters and their values.

```
type SmartContractIntent struct
{
    Protocol            string
    Network             string
    Source              string
    DestinationType             DestType
    Destination         string
    Amount              uint64
    GasPriceLimit               int64
    GasLimit            uint64
    OperationType               OperationType
    OperationArgs               map[string]interface{ }
}
```

In some embodiments, the parameter OperationArgs is capable of modeling the arguments, even recursively (one smart contract calls another smart contract), of any smart contract independent of the blockchain-specific protocol. The operation intent data object 410 may be generated by a wallet system, such as an on-premises wallet managed by the digital asset security and management engine 330.

In some embodiments, since the intent, as reflected by the operation intent data object 410 that contains the set of parameters, may substantively define a blockchain operation, the intent can be subject to policy enforcement by an organization 120. The blockchain operation may be subject to one or more policies set forth by the organization 120, but a single policy is used as an example in FIG. 4 without loss of generality. In some embodiments, the policy may be maintained by an on-premises node 125, such as in embodiments where the organization 120 has full control of the policy enforcement using the on-premises node 125. Alternatively, or additionally, the policy may be maintained by a hosted node 135, the computing server 130, or another source. The policy may be specified by the organization 120 using a user-friendly platform and be translated into a data structure representing the policy. For example, the policy data object 420 may include a set of key-value pairs that are used to define the conditions and boundaries of the policy. In some embodiments, other types of data structures may also be used to record a policy. In policy enforcement, the operation intent data object 410 is compared to the policy data object 420 to determine whether the proposed blockchain operation is compliant with the applicable policy. In the simple example illustrated in FIG. 4, the policy only set forth the type of operation that is applicable to the policy and a maximum transaction amount. Since the transaction amount in the operation intent data object 410 is lower than the maximum amount set forth in the policy data object 420, the proposed blockchain operation is compliant with the policy. The comparison may be performed with an on-premises node 125 or by a hosted node 135 or the computing server 130, depending on the embodiments.

In some embodiments, the operation intent in the form of a human-understandable operation intent data object 410 may need to be compiled into an operation payload 430, which may take the form of an executable set of code for the blockchain 150. The compiling process may be based on the requirements and the protocols of the blockchain 150. The precise way how the operation intent data object 410 may be compiled into the operation payload 430 is blockchain specific and based on various factors such as the version of the blockchain 150, the current status of the blockchain 150, and the protocol requirements of the blockchain 150. In some embodiments, the operation payload 430 is typically in bytecode which is not easily humanly understandable. The operation payload 430 can be generated by an online service such as a component of the computing server 130 (e.g., the blockchain node engine 225) or a client-side software development kit (SDK) and may represent both static and dynamic (nOnce) data after all approvals for a particular policy have been collected. The sequence of bytes and requirements for ordering are blockchain specific.

In some embodiments, the wallet system may be managed internally by an organization 120 such as through an on-premises node 125 while the generation of the operation payload 430 may be performed by a source external to the organization 120 such as the computing server 130. From the perspective of the on-premises node 125, the computing server 130 or another device that generates the operation payload 430 may be an untrusted source. For example, the communication between the on-premises node 125 and the computing server 130 may be through a network that may be subject to attack from a malicious party. As such, the on-premises node 125 may conduct a parameter conformity enforcement to verify that the operation payload 430 accurately reflects the original intent of the blockchain operation. For example, the on-premises node 125 may receive the operation payload from an external source. The on-premises node 125 may decode (e.g., converting the bytecode back to source parameters) the operation payload 430 to extract a second set of one or more parameters reflected in the operation payload 430. The on-premises node 125 may compare the second set of parameters to the first set of parameters that are in the operation intent data object 410 to whether the two sets of parameters match each other.

Figure 5A:
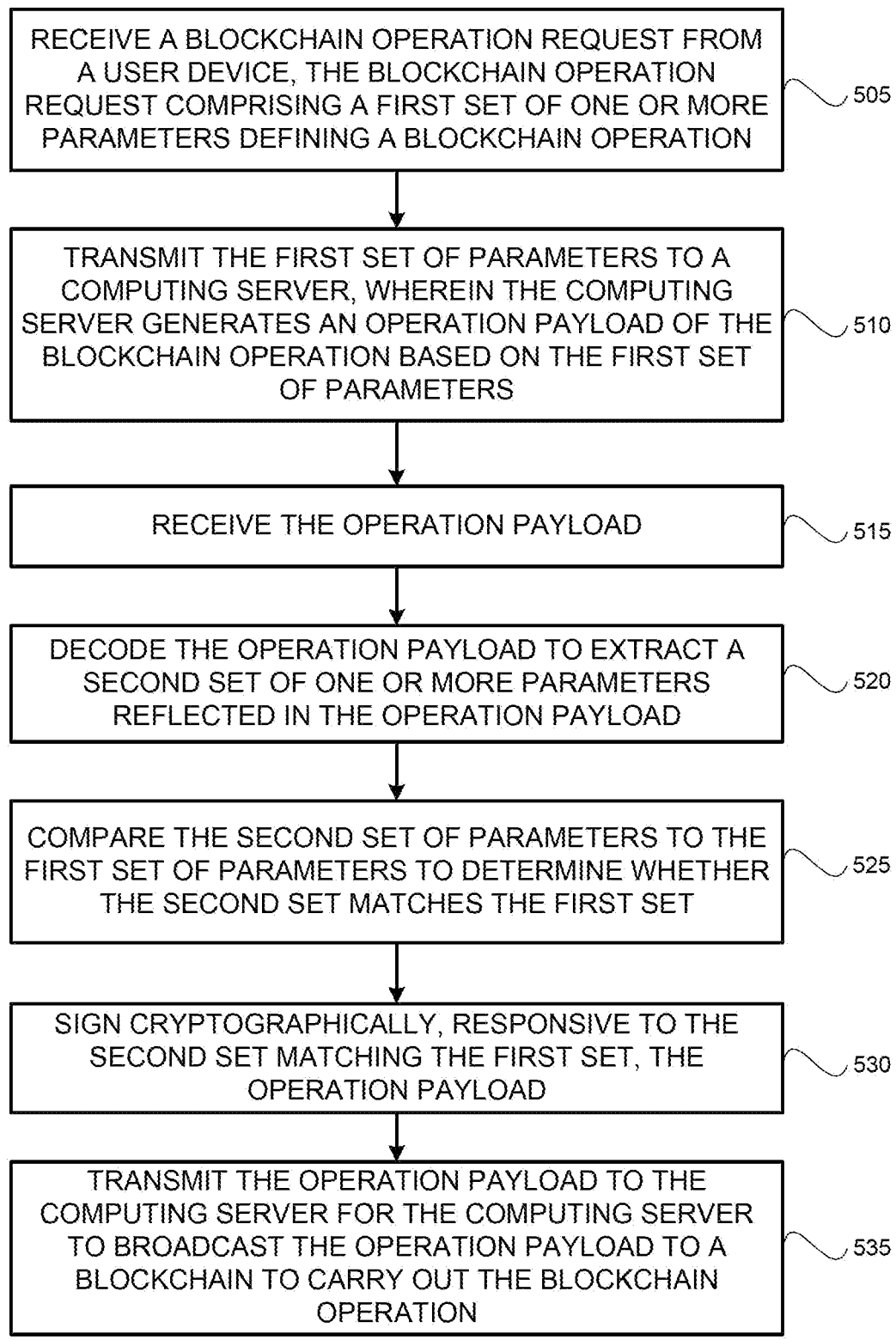
FIG. 5A is a flowchart depicting an example process for verifying a blockchain operation, in accordance with some embodiments.

FIG. 5A is a flowchart depicting an example process 500 for verifying a blockchain operation, in accordance with some embodiments. The process may be performed by a node such as an on-premises node 125 or one or more engines of the on-premises node 125 illustrated in FIG. 3, such as the digital asset security and management engine 330, the key management engine 335 and the multi-party computation engine 345. The process 500 may be embodied as a software algorithm that may be stored as computer instructions that are executable by one or more processors. The instructions, when executed by the processors, cause the processors to perform various steps in the process 500. In various embodiments, the process may include additional, fewer, or different steps. While various steps in process 500 may be discussed with the on-premises node 125, each step may be performed by a different computing device.

In some embodiments, an on-premises node 125 may receive 505 a blockchain operation request from a user device 110. For example, an initiator of a blockchain operation may be an employee of an organization 120. The blockchain operation can be making a deposit, making a transaction, posting an NFT, purchasing an NFT, participating in staking, invoking an autonomous program protocol 152 such as a smart contract, using a dApp that operates by one or more autonomous program protocols 152, or any suitable blockchain operation that is mentioned in this disclosure. The initiator may use a wallet application frontend to specify the blockchain operation and details of the operation. For example, through the wallet GUI, may specify that the operation is a transaction, select the recipient, the transaction amount, the type of token involved, etc.

Depending on embodiments, the wallet system may be maintained by the organization 120 through one or more on-premises nodes 125 or maintained by the computing server 130. For example, in a case where the organization 120 decides to run its own on-premises wallet, the on-premises node 125 may manage the wallet system through the digital asset security and management engine 330 as discussed in FIG. 3. The on-premises node 125 may initially be provided by the computing server 130 to the organization 120 for the organization 120 to operate the on-premises node 125 on-premises.

The blockchain operation request may include a first set of one or more parameters defining the blockchain operation. As discussed in FIG. 4, the parameters are typically non-dynamic data elements, which are data elements that do not depend on the dynamic state of a blockchain 150. For example, parameters that may be specified in a blockchain operation request may include the protocol (type of blockchain 150), the network (e.g., network available for a specific blockchain 150), the type of operation (e.g., transfer, staking, smart contract operation, etc.), the transaction amount, the source blockchain address, the destination blockchain address, etc. These are parameters that substantively define the blockchain operation.

In some embodiments, the on-premises node 125 may transmit 510 the first set of parameters to the computing server 130 or an external device, such as a device that has the capability to generate a blockchain payload. In some embodiments, there are one or more reasons that an on-premises node 125 may interact with a blockchain 150 through an external device. For example, in order for a device to be able to generate the blockchain payload, the device may need to be updated to support the latest protocols and features of the blockchain 150. In some embodiments, an on-premises node 125 may be designed in such a way that the on-premises node 125 does not directly communicate to the Internet or has security requirements that do not allow the on-premises node 125 to be updated frequently enough to keep up with the latest updates of various blockchains 150. In some embodiments, using a device such as the computing server 130 may also allow an on-premises node 125 to verify transactions in a blockchain-agnostic way because the direct operation with a blockchain 150 is delegated to the computing server 130. In addition, the computing server 130 may generally have expanded capability to work with many blockchains 150. Hence, an on-premises node 125 using the computing server 130 to interact with one of the blockchains 150 expands the wallet functionalities to work with different blockchains when compared to the on-premises node 125 directly serving as a blockchain node. An external device may be a device that is external to the secure environment maintained by the on-premises node 125. In some embodiments, the external device can be a device that is managed by the organization 120, such as a device that is installed with a software development kit (SDK) provided by the computing server 130. In this disclosure, the computing server 130 is often used as a representative example of the external device that interacts with the on-premises node 125, but other external devices may also be used.

Upon receiving the first set of parameters that define the proposed blockchain operation, the computing server 130 may generate an operation payload of the blockchain operation based on the parameters. The generation of the payload is based on the protocol and requirement of a specific blockchain 150. In some embodiments, the generation may depend on both the non-dynamic data elements in the blockchain operation intent and some dynamic data elements that depend on the state of the blockchain 150. For example, dynamic data elements such as the current block number, the hash of a recent block, unspent transaction output (UTXO) and other dynamic parameters that may be time-sensitive or dependent on other factors. The computing server 130 may query the blockchain 150 to retrieve the relevant dynamic data elements. Combining the non-dynamic and dynamic data elements and based on the blockchain protocol, the computing server 130 may generate the operation payload.

In some embodiments, the on-premises node 125 may receive 515 the operation payload. The operation payload transmitted by the computing server 130 may be un-signed or does not include sufficient digital signatures to be broadcasted as a valid transaction to a blockchain 150.

In some embodiments, an on-premises node 125 may decode 520 the operation payload to extract a second set of one or more parameters reflected in the operation payload. For example, the operation payload, such as the operation payload 430 illustrated in FIG. 4, may be in bytecode. The on-premises node 125 may decode the bytecode, such as by converting the bytecode to a source code to reveal the parameters that are included in the operation payload.

In some embodiments, the on-premises node 125 may compare 525 the second set of parameters to the first set of parameters to determine whether the second set matches the first set. The on-premises node 125 may perform parameter conformity enforcement to ensure the two sets of parameters match so that the operation payload accurately reflects the original intent of the blockchain transaction request. For example, the on-premises node 125 may check if the values in the two sets of parameters match.

In some embodiments, decoding the operation payload and comparing the parameters may be performed in a sandbox environment such as in the sandbox engine 320. In some embodiments, the sandbox environment may be operated in a binary code programming language. For example, both the sandbox engine 320, which includes the operation decoder 322 and the key management engine 335 of the on-premises node 125 may be built using blockchain-specific code and cross-compiled into a binary language such as WASM. This allows the on-premises node 125 to be securely configured with sandboxed code, which can unpack an unsigned operation payload and programmatically compare the parameters in the operation payload to the parameters in the original operation intent. In some embodiments, elements in the original operation intent can be annotated with metadata indicating inclusion in a hashing function for identity matching. As a simplified example, the parameters in the original operation request may be serialized to JSON:

```
{
  "Array" : [
    {
```

```
      "type" : "Address",
      "name" : "To",
      "value" : "0xca14b0714e0e9e19bc4a90c2af377d8000f0a113",
      "isKey" : true
    }
  ]
}
```

In some embodiments, elements that are set to isKey to true that values can be concatenated and hashed. The elements in the operation payload may be decoded so that the elements correspond to those key values in the parameters in the original operation request. The elements in the operation payload may then also be combined and hashed providing an audit log or blockchain operation. This mechanism may provide both the integrity of the operation intent and the resulting values. This allows the on-premises node 125 to show to the user approvers that the blockchain operation that is to be submitted to the blockchain is equal to the original operation request.

In some embodiments, in response to the second set matching the first set, the on-premises node 125 may cryptographically sign 530 the operation payload. For example, after determining that the two sets of parameters match, the on-premises node 125 may send the parameters to one or more user approvers to review the parameters and authorize the transaction. The signing may include using the private key corresponding to the blockchain address of the operation initiator (e.g., source blockchain address). Additionally, upon approval, each approver may individually cryptographically sign the operation payload or collectively have a signature that represents the organization 120. For example, the on-premises node 125 may obtain approvals from all relevant approvers. Upon receiving all of the approvals, the on-premises node 125 may use a private key that is owned by the organization 120 to sign the operation payload. The private key may be owned by a named entity, which can be an employee, a team, a department or the organization 120. Whether a private cryptographic key belongs to an individual within the organization 120 or belongs to the organization 120, the on-premises node 125 may use an MPC technique to generate the private key. For example, the key management engine 335 may generate the private cryptographic key and to generate a digital signature for the operation payload.

In some embodiments, an on-premises node 125 may transmit 535 the operation payload with the digital signature to the computing server 130 for the computing server to broadcast the operation payload to a blockchain to carry out the blockchain operation. The computing server 130 may serve as a blockchain node of the blockchain 150. The computing server 130 broadcast the operation payload and the operation will be carried out as a new block is generated and the operation is validated.

In some embodiments, the on-premises node 125 may also enforce one or more policies before the blockchain operation is authorized. The on-premises node 125 may determine that the blockchain operation is governed by a policy. The on-premises node 125 may seek authorization for the blockchain operation according to the policy. The authorization process may occur at any appropriate stage of the operation verification process 500. For example, in some embodiments, the parameters in the original operation request may be checked against the relevant policy before the parameters are transmitted to the computing server 130 to generate an operation payload. In some embodiments, the policy may have approval requirements (e.g., in the case of multi-party authorization) in addition to the parameter values set forth in the policy conditions. After the operation payload is received and decoded, the on-premises node 125 may seek approvals from one or more natural persons by sending an approval request to the user device 110, such as sending an approval request message that includes the parameters as reflected in the operation payload. For example, the authorization process may include a multi-party authorization process. The on-premises node 125 may transmit the parameters defining the blockchain operation to a first user device 110 (e.g., the device of the initiator) for authorization. The on-premises node 125 may additionally transmit the parameters to a second user device 110 for authorization. The second user device 110 may be the device of an approver, such as the manager of the initiator or any approver as defined in the policy. In some embodiments, signing cryptographically the operation payload is conditioned upon the authorization being fulfilled.

Figure 5B:
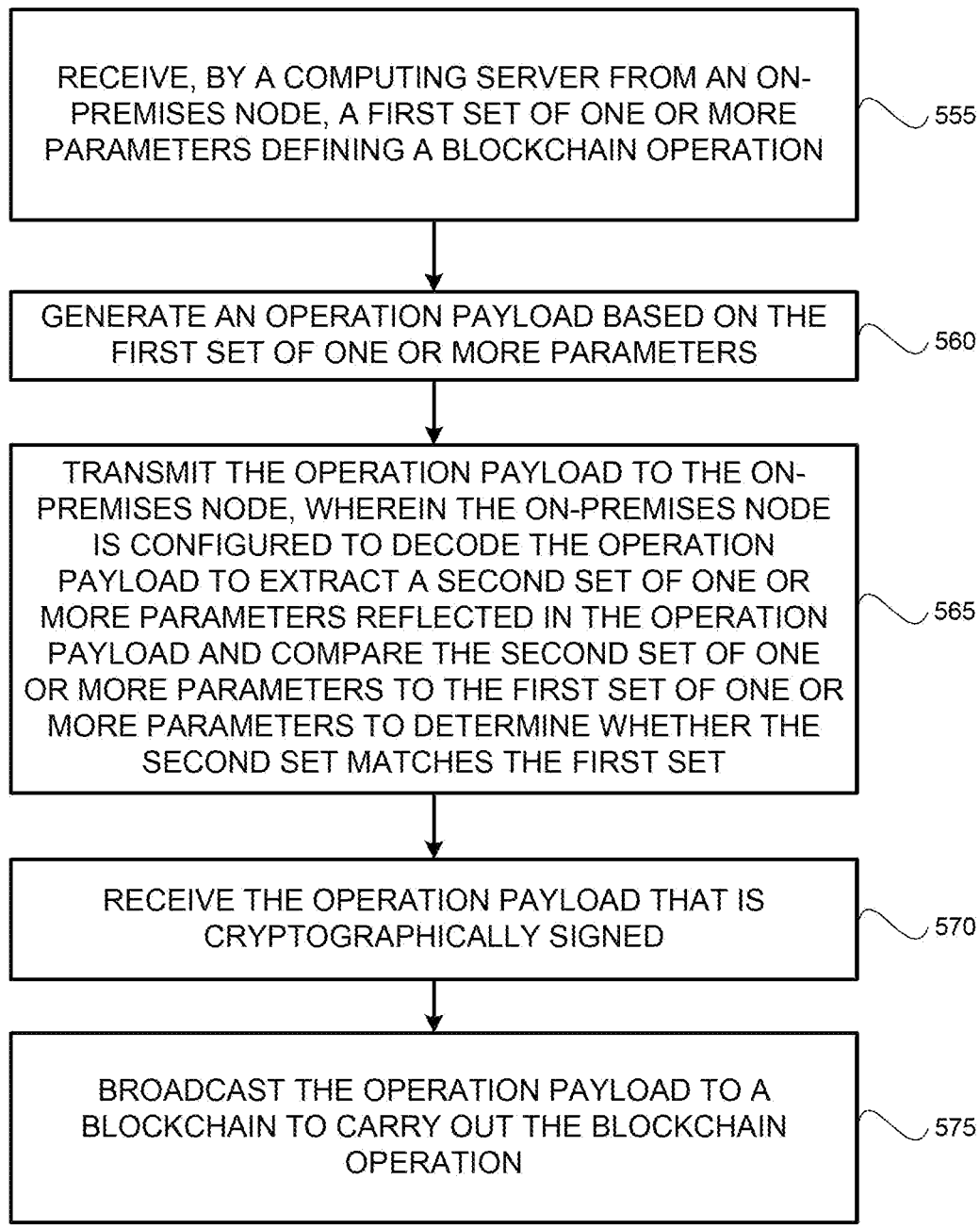
FIG. 5B is a flowchart depicting an example process for a computing server to carry out a blockchain operation, in accordance with some embodiments.

FIG. 5B is a flowchart depicting an example process 550 for a computing server to carry out a blockchain operation, in accordance with some embodiments. The process may be performed by a computing server 130 or one or more engines of the computing server 130 illustrated in FIG. 2, such as blockchain node engine 225 and the blockchain operation engine 235. The process 550 may be embodied as a software algorithm that may be stored as computer instructions that are executable by one or more processors. The instructions, when executed by the processors, cause the processors to perform various steps in the process 550. In various embodiments, the process may include additional, fewer, or different steps. While various steps in process 550 may be discussed with the computing server 130, each step may be performed by a different computing device.

The process 550 may be corresponding to the process 500 and focuses on the process performed by the computing server 130. The detail in the process 500 is not repeated in the discussion of process 550.

In some embodiments, a computing server 130 may receive 555, from an on-premises node 125, a first set of one or more parameters defining a blockchain operation. The first set of parameters may represent an operation intent in a blockchain operation request. In some embodiments, the computing server 130 may generate 560 an operation payload based on the first set of one or more parameters. For example, the computing server 130 may retrieve dynamic data elements that are specific to the blockchain. The computing server 130 may generate the operation payload based on both the parameters in the first set and the dynamic data elements. Generating the operation payload may include converting the parameters to bytecode.

In some embodiments, the computing server 130 may transmit 565 the operation payload to the on-premises node 125. The on-premises node 125 is configured to decode the operation payload to extract a second set of one or more parameters reflected in the operation payload and compare the second set of parameters to the first set of parameters to determine whether the second set matches the first set. The operation of the on-premises node 125 is discussed in FIG. 5A.

In some embodiments, the computing server 130 may receive 570 the operation payload that is cryptographically signed. In some embodiments, the operation payload is signed by a private cryptographic key that is generated by an MPC technique. In some embodiments, the computing server 130 may verify one or more digital signatures that are associated with the cryptographically signed operation payload. The digital signatures may be signed by various parties involved. For example, a policy management engine may have a digital signature indicating that the blockchain operation is in compliance with one or more policies of the organization 120. One or more named entities, such as individual approvers or a group key holder, may also sign the operation payload.

In some embodiments, a computing server 130 may broadcast 575 the operation payload to a blockchain 150 to carry out the blockchain operation. The computing server 130 may serve as a blockchain node, which submits the operation payload to the blockchain 150. The destination of the operation payload may be a ledger of the blockchain 150 or an autonomous program protocol 152 recorded on the blockchain 150. In the case of the autonomous program protocol 152, the autonomous program protocol 152 may execute the operation payload as input arguments and generate results or actions based on the code instructions of the autonomous program protocol 152. The operation is completed when the block that records the blockchain operation is generated and validated.

The combination of the on-premises node 125 and the computing server 130 that respectively carries out the process 500 and the process 550 may constitute a system that carries out blockchain operations with a secure verification mechanism that is generally applicable to different natures of blockchains 150. For example, the computing server 130 may include first one or more processors and first memory that is configured to store a first set of instructions. The first set of instructions, when executed by the first one or more processors, causes the first one or more processors to perform a first set of steps as described in the process 550. An on-premises node 125 may be in communication with the computing server 130 and may include second one or more processors and second memory configured to store a second set of instructions. The second set of instructions, when executed by the second one or more processors, causes the second one or more processors to perform a second set of steps described in the process 500.

Example Data and Communication Flow

Figure 6A:
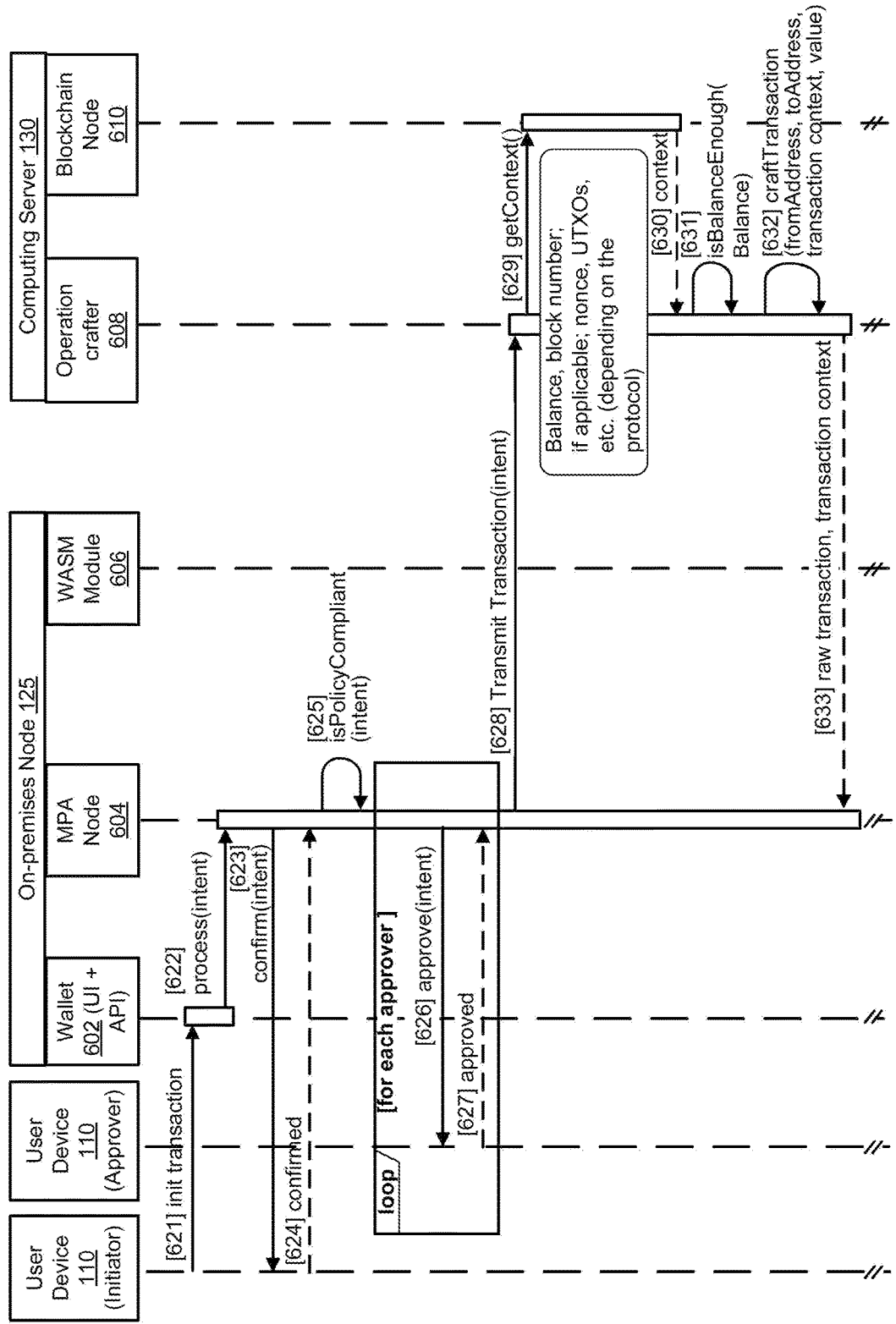
FIGS. 6A and 6B are sequence diagrams illustrating an example series of interactions to verify a blockchain operation, in accordance with some embodiments.
Figure 6B:
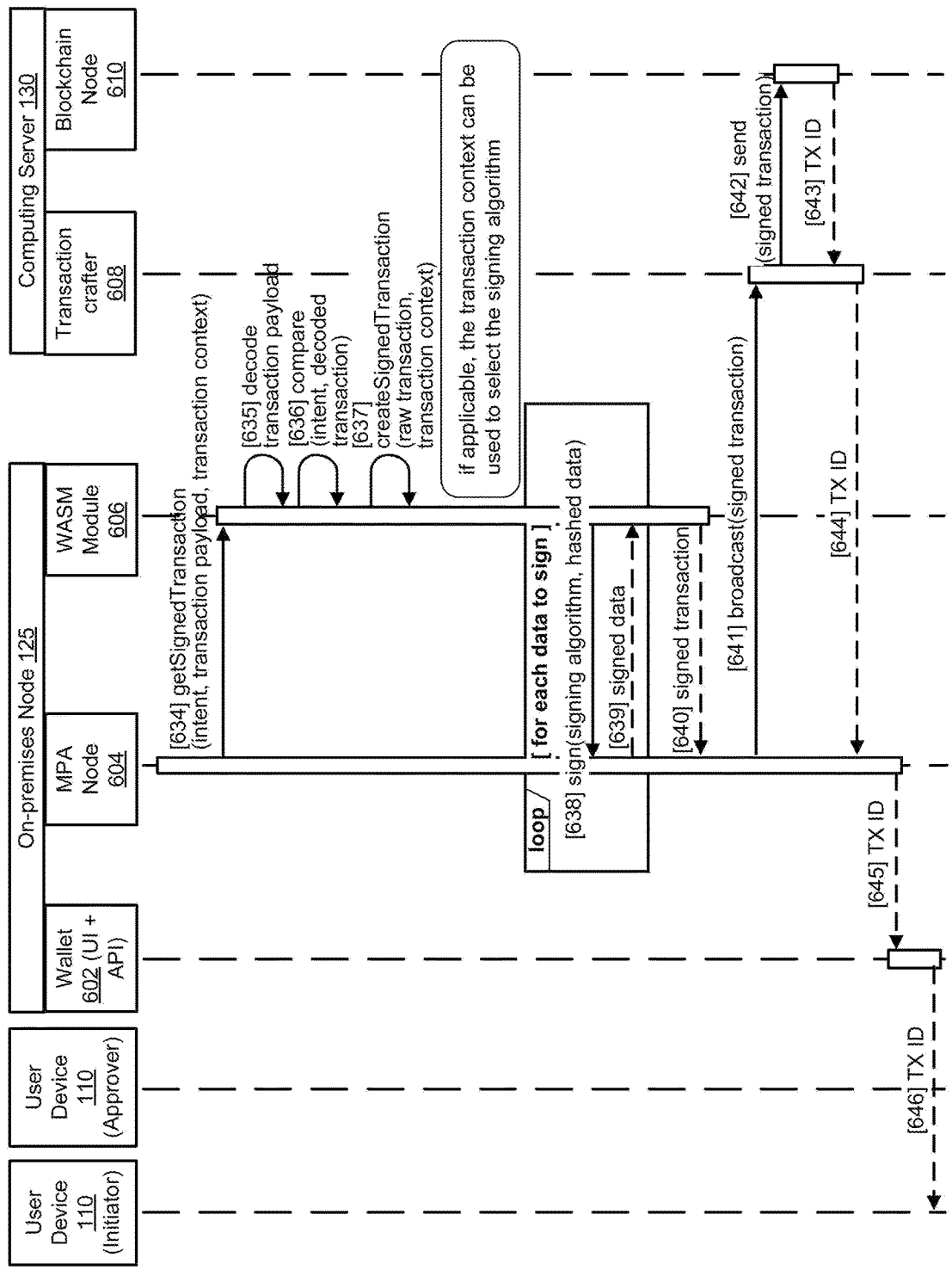

FIGS. 6A and 6B are sequence diagrams illustrating an example series 600 of interactions among components of the system environment 100 to verify a blockchain operation, in accordance with some embodiments. The series 600 is an example of the processes illustrated in FIG. 5A and FIG. 5B. The series 600 illustrated in FIGS. 6A and 6B represents specific sets of instructions that may be stored in one or more computer-readable media, such as memory of different servers. The instructions, when executed by one or more processors of the depicted entities, cause one or more processors to perform the described interactions. As depicted in FIGS. 6A and 6B, the series 600 is performed by the first user device 110, the second user device 110, an on-premises node 125, and the computing server 130. The on-premises node 125 and the computing server 130 may include sub-components that are used to perform the series 600. Those sub-components are merely examples that are used to illustrate some functionalities of the on-premises node 125 and computing server 130. In various embodiments the on-premises node 125 may not contain the precise components shown in the series 600 and the functionalities may be distributed differently than the example shown in the series 600. The same may apply to the computing server 130. Also, the series 600 shows an example of multi-party authorization (MPA) workflow for approving a blockchain transaction. In various embodiments, MPA may not be required in carrying out an operation verification.

In some embodiments, the example sub-components of the on-premises node 125 may include a wallet 602, which represents both the front-end user interface and the API of the wallet 602, an MPA node 604, and a WASM module 606. The wallet 602 may be an example of a wallet system that is set up by the digital asset security and management engine 330. The MPA node 604 may represent the general functionality of the on-premises node 125 that can be used to perform MPA. For example, the MPA node 604 may include the functionalities of the configuration and policy engine 310, the key management engine 335 and the multi-party computation engine 345. The WASM module 606 may be an example of the sandbox engine 320.

In some embodiments, the WASM module 606 may be a modularized model that is independently added to the on-premises node 125 as additional functionality of the on-premises node 125. For example, the WASM module 606 may be added to the on-premises node 125 through a system administrator selecting the WASM module 606 from the digital distribution platform 250 of the computing server 130. The WASM module 606 may be built using a blockchain specific code (typically a higher-level language) and be cross-compiled into WASM format. The use of WASM, or similar low-level binary instructions, provides various advantages to the on-premises node 125. For example, the WASM execution is sandboxed. The WASM module 606 may also make the MPA node 604 protocol agnostic because the low-level binary code of WASM may be used to create various protocol decoders that allow higher-level languages such as C, C++, Python, etc. to be compiled into WSAM objects. Also, the WASM module 606 allows features and protocols in the sandbox environment to be added or updated on the fly without affecting the larger operation of the on-premises node 125 because updating WASM module 606, which is sandboxed, typically does not require access to the system files of the on-premises node 125.

In some embodiments, the sub-components of the computing server 130 may include an operation crafter 608 and a blockchain node 610. The operation crafter 608 may be managed by the blockchain operation engine 235. The blockchain node 610 may be operated by the blockchain node engine 225 and is up to date to conform with the current protocol requirements of the blockchain 150 that is involved in the transaction.

The series 600 depicted in FIGS. 6A and 6B is merely an example of a sequence of interactions. In other embodiments the sequence of interactions may include fewer, additional, or different actions performed by the same or different entities. While the steps in series 600 are illustrated graphically in FIGS. 6A and 6B as sequences of steps, some of the steps may occur in different sequences than illustrated or may occur concurrently with other steps. Also, while series 600 is depicted as a single series, in various embodiments and situations the series 600 may be further broken down into multiple series 600. For example, the series depicted in FIG. 6A and the series depicted in FIG. 6B may be two independent series. Also, while an MPA transaction is illustrated in series 600 as an example, the verification process may be used in other blockchain operations.

Referring to FIG. 6A, the first user device 110 controlled by the transaction initiator may initiate 621 a transaction. The request for initiating the transaction may be directed to the wallet 602. For example, the initiator may use the UI of the wallet application installed at the first user device 110 to specify the parameters of the transaction and request the initiation of the transaction. The wallet 602 may process 622 the intent of the transaction such as the parameters that define the transaction and transmit the intent to the MPA node 604. The MPA node 604 may confirm 623 the intent with the first user device 110 and confirm that the initiator intends to carry out the transaction. The first user device 110 may provide a confirmation 624 to the 604.

The MPA node 604 may examine 625 the intent (e.g., the parameters) to determine whether the intent is compliant with one or more policies. An example policy may specify a multi-party authorization (MPA) requirement for the transaction. As such, for each approver, the MPA node 604 may transmit 626 an approval request that includes the parameters of the intent of the transaction to one or more approvers to review. Each approver may approve 627 of the transaction and provide the approval to the MPA node 604.

Upon the initial approval, the MPA node 604 may transmit 628 the transaction intent, such as a data object that includes the parameters that define the transaction, to the operation crafter 608 of the computing server 130. Upon receiving the parameters, the operation crafter 608 may execute a function call getContext( ) to a blockchain node 610 to get dynamic data elements related to the current state of the blockchain 150. For example, the dynamic data elements may include the balance of the source address, the block number, nonce, UTXOs. The type of dynamic data elements that are relevant may depend on the protocols of the blockchain 150. The blockchain node 610 may transmit 630 the context to the operation crafter 608.

Upon receiving the dynamic data elements, the operation crafter 608 may perform certain basic checks such as determining 631 whether the source address has enough balance to perform the transaction. The operation crafter 608 may then generate 632 a transaction payload (an example of an operation payload). The operation crafter 608 may input parameters such as from Address, toAddress, transaction context, and value to compile the transaction payload. In some embodiments, the transaction payload is in the form of a bytecode. The operation crafter 608 may transmit 633 the raw transaction payload and the transaction context to the MPA node 604 of the on-premises node 125.

Referring to FIG. 6B, the MPA node 604 may initiate a process of getting signatures for the transaction payload. The process may be based on the parameters in the original transaction intent, the parameters in the transaction payload, and the transaction context. The MPA node 604 may call 634 a getSignedTransaction( ) request that is directed to the WASM module 606.

Upon receiving a call of the getSignedTransaction( ) function, the WASM module 606 may decode 635 the transaction payload in the sandbox environment. The decoding may include converting the bytecode to human-readable parameter values. The WASM module 606 may compare 636 the parameters extracted from the transaction payload to the parameters in the original intent of the blockchain transaction. Upon determining that the parameters match, the WASM module 606 may call the MPA node 604 to begin the signing process. In some cases, if applicable, the transaction context can be used to select the signing algorithm.

In a loop and in response to the WASM module 606 verifying the transaction parameters, the MPA node 604 may send 638 each approver a request to authorize the transaction. There can be more than one user device 110 that needs to approve the transaction before the transaction is signed. For example, for a particular user approver, the second user device 110 may seek to retrieve the private key, such as through an MPC technique. Each relevant user device 110 may return 639 the signed data to the MPA node 604. After the transaction payload is signed, the MPA node 604 may transmit 640 a copy of the signed transaction payload to the user device 110.

After a cryptographically signed transaction payload is generated, the MPA node 604 may send 641 a broadcast request for the signed transaction payload. The operation crafter 608 may send 642 the signed transaction payload to the blockchain node 610 for broadcasting. Upon successful broadcast of the transaction, the blockchain node 610 may transmit 643 a completed transaction identifier to the operation crafter 608. The transaction identifier may be forwarded 644 to the MPA node 604, which in term forwards 645 and 646 the transaction identifier to various user devices 110.

Example Blockchain Architecture

Figure 7A:
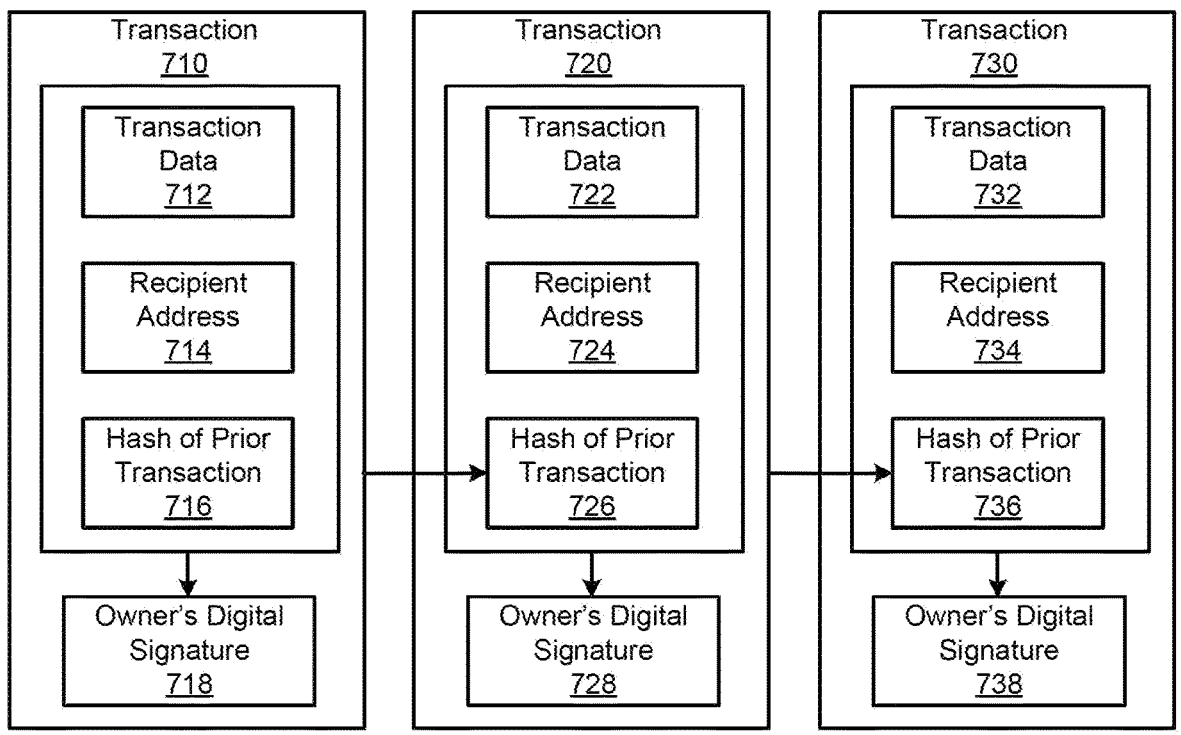
FIG. 7A is a block diagram illustrating a chain of transactions broadcasted and recorded on a blockchain, in accordance with some embodiments.

FIG. 7A is a block diagram illustrating a chain of transactions broadcasted and recorded on a blockchain, in accordance with some embodiments. The transactions described in FIG. 7A may correspond to any of the transactions and the transfer of blockchain-based units. A blockchain-based unit can be a cryptocurrency, a token, an NFT, a wrapped token, etc.

In some embodiments, a blockchain is a distributed system. A distributed blockchain network may include a plurality of blockchain nodes. Each blockchain node is a user or a server that participates in the blockchain network. In a public blockchain, any participant may become a blockchain node of the blockchain (permissionless). The blockchain nodes collectively may be used as a computing system that serves as a virtual machine of the blockchain. In some embodiments, the virtual machine or a distributed computing system may be simply referred to as a computer. Any blockchain node of a public blockchain may broadcast transactions for the nodes of the blockchain to record. Each digital wallet is associated with a private cryptographic key that is used to sign transactions and proves the ownership of a blockchain-based unit.

The ownership of a blockchain-based unit may be traced through a chain of transactions. A transaction may be referred to as a blockchain operation, which may include a transfer of a cryptocurrency or a token, a creation of a token, a recordation of an autonomous program protocol (e.g., a smart contract), execution of the autonomous program protocol, and another decentralized application operation. In FIG. 7A, a chain of transactions may include a first transaction 710, a second transaction 720, and a third transaction 730, etc. The transactions in FIG. 7A are typically recorded in the ledger of the blockchain. Each of the transactions in the chain may have a fairly similar structure except the very first transaction in the chain. The first transaction of the chain may be generated by a smart contract or a mining process and may be traced back to the smart contract that is recorded on the blockchain or the first block in which the blockchain-based unit was generated. While each transaction is illustrated as linking to a prior transaction in FIG. 7A, the transaction does not need to be recorded on consecutive blocks on the blockchain. For example, the block recording the transaction 710 and the block recording the transaction 720 may be separated by hundreds or even thousands of blocks. In some embodiments, the traceback of the prior block may be tracked by the hash of the prior block that is recorded by the current block. In other blockchains, there are no links among the transactions. The transactions are simply ordered temporally on the ledger that include a number of blocks. For example, in some embodiments, an account model is used and transactions do not have any references to previous transactions. In those blockchains, transactions are not chained and do not contain the hash of the previous transaction.

Referring to one of the transactions in FIG. 7A, for illustration, the transaction 720 may be referred to as a current transaction. Transaction 710 may be referred to as a prior transaction and transaction 730 may be referred to as a subsequent transaction. Each transaction includes a transaction data 722, a recipient address 724, a hash of the prior transaction 726, and the current transaction's owner's digital signature 728. The transaction data 722 records the substance of the current transaction 720. For example, the transaction data 722 may specify a transfer of a quantity of a blockchain-based unit (e.g., a coin, a blockchain token, etc.). In some embodiments, the transaction data 722 may include code instructions of a smart contract.

In some embodiments, the recipient address 724 is a version of the public key that corresponds to the private key of the digital wallet of the recipient. In one embodiment, the recipient address 724 is the public key itself. In another embodiment, the recipient address 724 an encoded version of the public key through one or more functions such as some deterministic functions. For example, the generation of the recipient address 724 from the public key may include hashing the public key, adding a checksum, adding one or more prefixes or suffixes, encoding the resultant bits, truncating the address, and/or other suitable algorithmic operations. The recipient address 724 may be a unique identifier of the digital wallet of the recipient on the blockchain.

The hash of the prior transaction 726 may be the hash of the entire transaction data of the prior transaction 710. Likewise, the hash of the prior transaction 736 is the hash of the entire transaction data of the transaction 720. The hashing of the prior transaction 710 may be performed using a hashing algorithm such as a secure hash algorithm (SHA) or a message digest algorithm (MD). In some embodiments, the owner corresponding to the current transaction 720 may also use the public key of the owner to generate the hash. The hash of prior transaction 726 provides a traceback of the prior transaction 710 and also maintains the data integrity of the prior transaction 710.

In generating a current transaction 720, the digital wallet of the current owner of the blockchain-based unit may use its private key to encrypt the combination of the transaction data 722, the recipient address 724, and the hash of prior transaction 726 to generate the owner's digital signature 728. To generate the current transaction 720, the current owner may specify a recipient by including the recipient address 724 in the digital signature 728 of the current transaction 720. The subsequent owner of the blockchain-based unit is fixed by the recipient address 724. In other words, the subsequent owner that generates the digital signature 738 in the subsequent transaction 730 is fixed by the recipient address 724 specified by the current transaction 720. To verify the validity of the current transaction 720, any nodes in the blockchain network may trace back to the prior transaction 710 (by tracing the hash of prior transaction 726) and locate the recipient address 714. The recipient address 714 corresponds to the public key of the digital signature 728. Hence, the nodes in the blockchain network may use the public key to verify the digital signature 728. Hence, a current owner who has the blockchain-based unit tied to the owner's blockchain address can prove the ownership of the blockchain-based unit. In this disclosure, it can be described as the blockchain-based unit being connected to a public cryptographic key of a party because the blockchain address is derived from the public key. For example, the computing server 130 may own blockchain-based units. The blockchain-based units are connected to one of the public cryptographic keys of the computing server 130.

The transfer of ownership of a blockchain-based unit may be initiated by the current owner of the blockchain-based unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the block generation process.

Figure 7B:
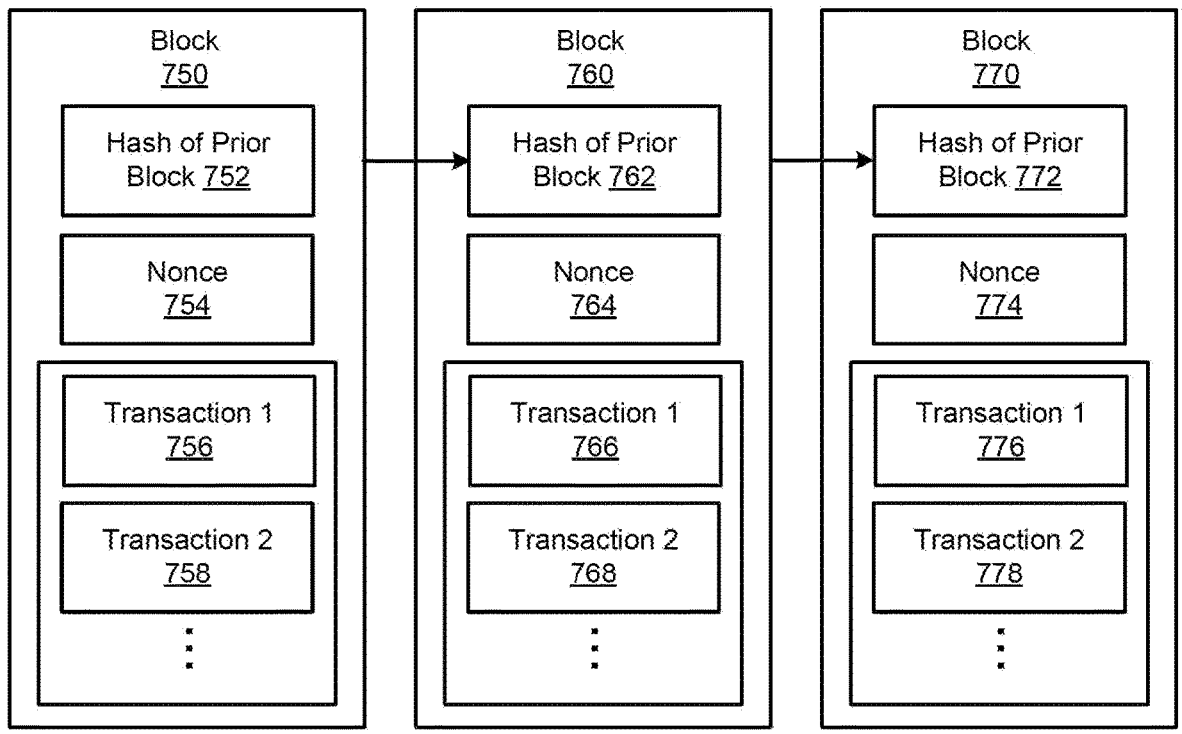
FIG. 7B is a block diagram illustrating a connection of multiple blocks in a blockchain, in accordance with some embodiments.

FIG. 7B is a block diagram illustrating a connection of multiple blocks in a blockchain, in accordance with some embodiments. Each block of a blockchain, except the very first block which may be referred to as the genesis block, may have a similar structure. The blocks together may be referred to as the ledger of the blockchain. The blocks 750, 760, and 760 may each include a hash of the prior blockchain 752, a nonce 754, and a plurality of transactions (e.g., a first transaction 756, a second transaction 758, etc.). Each transaction may have the structure shown in FIG. 7A. An autonomous program protocol may also be stored in one of the transactions and execution results of the autonomous program protocol may be stored in subsequent transactions.

In a block generation process, a new block may be generated through a consensus mechanism such as mining (e.g., proof of work) or voting (e.g., proof of stake). For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may use a certain format in the hash of the prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

In a voting process, the nodes in a blockchain system may vote to determine the content of a new block. Depending on the embodiment, a selected subset of nodes or all nodes in the blockchain system may participate in the votes. For example, in some embodiments, a staking process is required before a node can participate in the voting process. When there are multiple candidates new blocks that include different transactions are available, the nodes will vote for one of the blocks to be linked to the existing block. The voting may be based on the voting power of the nodes.

By way of an example of a block generation process using mining, in generating the hash of prior block 762, a node may randomly combine a version of the prior block 750 with a random nonce to generate a hash. The generated hash is somewhat of a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes finds a hash that satisfies the criteria. The nonce that is used to generate the satisfactory hash is the nonce 764. The node that first generates the hash 762 may also select what transactions that are broadcasted to the blockchain network are to be included in the block 760. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., gas) for having the transaction recorded. After the transactions are selected and the data of the block 760 is fixed, the nodes in the blockchain network repeat the trial and error process to generate the hash of prior block 772 by trying different nonce. In embodiments that use voting to generate new blocks, a nonce may not be needed. A new block may be linked to the prior block by including the hash of the prior block.

New blocks may be continued to be generated through the block generation process. A transaction of a blockchain-based unit (e.g., an electronic coin, a blockchain token, etc.) is complete when the broadcasted transaction is recorded in a block. In some embodiments, the transaction is considered settled when the transaction is considered final. A transaction is typically considered final when there are multiple subsequent blocks generated and linked to the block that records the transaction.

In some embodiments, some of the transactions 756, 758, 766, 768, 776, 778, etc. may include one or more smart contracts. The code instructions of the smart contracts are recorded in the block and are often immutable. When conditions are met, the code instructions of the smart contract are triggered. The code instructions may cause a computer (e.g., a virtual machine of the blockchain) to carry out some actions such as generating a blockchain-based unit and broadcasting a transaction documenting the generation to the blockchain network for recordation.

Computing Machine Architecture

Figure 8:
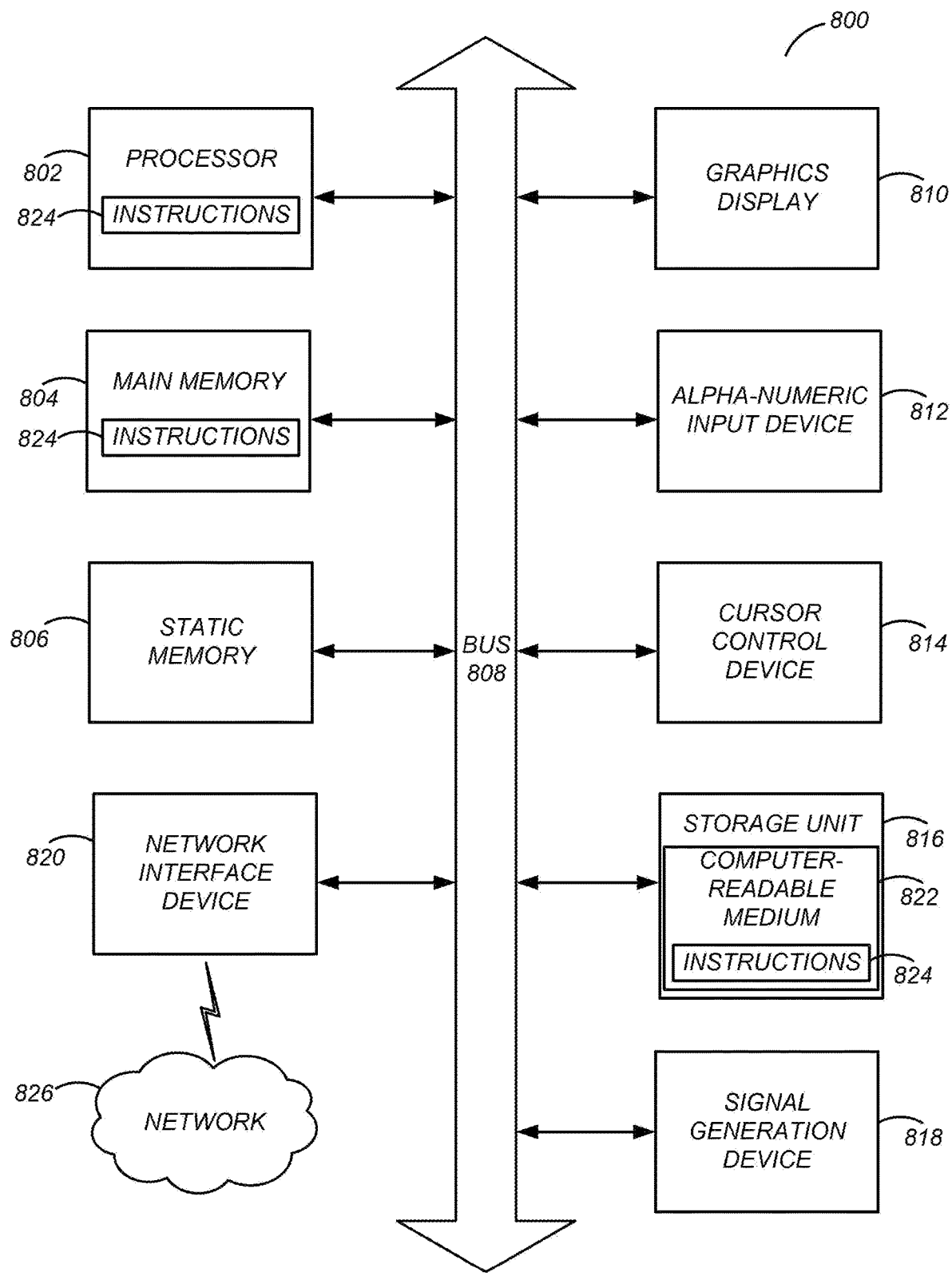
FIG. 8 is a block diagram illustrating components of an example computing machine that is capable of reading instructions from a computer-readable medium and execute them in a processor (or controller).

FIG. 8 is a block diagram illustrating components of an example computing machine that is capable of reading instructions from a computer-readable medium and executing them in a processor (or controller). A computer described herein may include a single computing machine shown in FIG. 8, a virtual machine, a distributed computing system that includes multiple nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1, 2, and 3, including but not limited to, the user device 110, the computing server 130, an on-premises node 125, a hosted node 135, a node of a blockchain network, and various engines, modules interfaces, terminals, and machines shown in FIG. 2. While FIG. 8 shows various hardware and software elements, each of the components described in FIGS. 1, 2, and 3 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

In some embodiments, a computer-readable medium includes one or more computer-readable media that, individually, distributedly, or together, include instructions that, when executed by one or more processors, cause the one or more processors to perform, individually, distributedly, or together, the steps of the instructions stored on the one or more computer-readable media. Similarly, a processor includes one or more processors or processing units that, individually, distributedly, or together, perform the steps of instructions stored on a computer-readable medium.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system comprising:
a computing server comprising first one or more processors and first memory configured to store a first set of instructions, wherein the first set of instructions, when executed by the first one or more processors, causes the first one or more processors to perform a first set of steps comprising:
receiving a first set of one or more parameters defining a blockchain operation; and
generating an operation payload in bytecode based on the first set of one or more parameters, the bytecode executable on a blockchain; and
an on-premises node in communication with the computing server, the on-premises node comprising second one or more processors and second memory configured to store a second set of instructions, wherein the second set of instructions, when executed by the second one or more processors, causes the second one or more processors to perform a second set of steps comprising:
receiving, by the on-premises node, the operation payload in the bytecode from the computing server;
decoding and reversing the executable bytecode into a second set of one or more parameters in a source code corresponding to the generated operation payload;
comparing the second set of one or more parameters to the first set of one or more parameters to determine whether the second set matches the first set;
signing cryptographically, responsive to the second set matching the first set, the operation payload; and
transmitting the operation payload to the computing server for the computing server to broadcast the operation payload to the blockchain to execute the bytecode to carry out the blockchain operation.

2. The system of claim 1, wherein the one or more parameters in the first set defining the blockchain operation comprise non-dynamic data elements of the blockchain operation.

3. The system of claim 1, wherein the operation payload generated by the computing server comprises dynamic data elements that are specific to the blockchain and wherein the operation payload is generated based on both the one or more parameters in the first set and the dynamic data elements.

4. The system of claim 1, wherein decoding the operation payload comprises converting the bytecode to a source code.

5. The system of claim 1, wherein decoding the operation payload comprises decoding the operation payload in a sandbox environment that is operated in a binary code programming language.

6. The system of claim 1, wherein the on-premises node is provided by the computing server to an organization for the organization to operate the on-premises node on premises.

7. The system of claim 6, wherein the computing server is untrusted from a perspective of the on-premises node so that the on-premises node is configured to compare the second set of one or more parameters to the first set of one or more parameters to verify that the operation payload accurately reflects the blockchain operation.

8. The system of claim 1, wherein the second set of steps further comprises:
determining that the blockchain operation is governed by a policy; and
seeking an authorization of the blockchain operation according to the policy, wherein signing cryptographically the operation payload is performed responsive to the authorization is fulfilled.

9. The system of claim 8, wherein the authorization comprises a multi-party authorization, and seeking the authorization of the blockchain operation according to the policy comprises:
transmitting the one or more parameters defining the blockchain operation to a user client device for authorization; and
transmitting, based on the policy, the one or more parameters defining the blockchain operation to a second user device for authorization.

10. The system of claim 1, wherein signing cryptographically the operation payload comprises:
using a multi-party computation technique to generate a private cryptographic key; and
using the private cryptographic key to generate a digital signature for the operation payload.

11. A computer-implemented method, comprising:
receiving a blockchain operation request from a user device, the blockchain operation request comprising a first set of one or more parameters defining a blockchain operation;
transmitting the first set of one or more parameters to a computing server, wherein the computing server generates an operation payload in bytecode based on the first set of one or more parameters, the bytecode executable on a blockchain;
receiving, by an on-premises node, the operation payload in the bytecode transmitted from the mounting server;
decoding and reversing the executable bytecode into a second set of one or more parameters in a source code corresponding to the generated operation payload;
comparing the second set of one or more parameters to the first set of one or more parameters to determine whether the second set matches the first set;
signing cryptographically, responsive to the second set matching the first set, the operation payload; and
transmitting the operation payload to the computing server for the computing server to broadcast the operation payload to the blockchain to execute the byte code to carry out the blockchain operation.

12. The computer-implemented method of claim 11, wherein the operation payload generated by the computing server comprises dynamic data elements that are specific to the blockchain and the operation payload is generated based on both the one or more parameters in the first set and the dynamic data elements.

13. The computer-implemented method of claim 11, wherein decoding the operation payload comprises converting the bytecode to a source code.

14. The computer-implemented method of claim 11, wherein decoding the operation payload comprises decoding the operation payload in a sandbox environment that is operated in a binary code programming language.

15. The computer-implemented method of claim 11, further comprising:
   determining that the blockchain operation is governed by a policy; and
   seeking an authorization of the blockchain operation according to the policy, wherein signing cryptographically the operation payload is performed responsive to the authorization is fulfilled.

16. The computer-implemented method of claim 15, wherein the authorization comprises a multi-party authorization, and seeking the authorization of the blockchain operation according to the policy comprises:
   transmitting the one or more parameters defining the blockchain operation to the user device for authorization; and
   transmitting, based on the policy, the one or more parameters defining the blockchain operation to a second user device for authorization.

17. A computer-implemented method, comprising:
   receiving, by a computing server from an on-premises node, a first set of one or more parameters defining a blockchain operation;
   generating an operation payload in bytecode based on the first set of one or more parameters, the bytecode executable on a blockchain;
   transmitting, from the computing server, the operation payload in the bytecode to the on-premises node, wherein the on-premises node is configured to decode and revere the executable bytecode into a second set of one or more parameters in a source code corresponding to the generated operation payload and compare the second set of one or more parameters to the first set of one or more parameters to determine whether the second set matches the first set;
   receiving the operation payload that is cryptographically signed; and
   broadcasting the operation payload to a blockchain to execute the byte code to carry out the blockchain operation.

18. The computer-implemented method of claim 17, wherein generating the operation payload comprises:
   retrieving dynamic data elements that are specific to the blockchain; and
   generating the operation payload based on both the one or more parameters in the first set and the dynamic data elements.

19. The computer-implemented method of claim 17, wherein generating the operation payload comprises converting the one or more parameters in the first set to bytecode.

20. The computer-implemented method of claim 17, wherein the cryptographically signed operation payload is signed by a private cryptographic key that is generated by a multi-party computation technique.

* * * * *